US011233937B1

(12) United States Patent
Solenberg et al.

(10) Patent No.: US 11,233,937 B1
(45) Date of Patent: Jan. 25, 2022

(54) AUTONOMOUSLY MOTILE DEVICE WITH IMAGE CAPTURE

(71) Applicant: Amazon Technologies, Inc., Seattle, WA (US)

(72) Inventors: Amy Solenberg, San Francisco, CA (US); Sitaram Baldwa, Fremont, CA (US); Raymond Zhang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/583,587

(22) Filed: Sep. 26, 2019

(51) Int. Cl.
| | |
|---|---|
| *H04N 5/232* | (2006.01) |
| *H04N 19/105* | (2014.01) |
| *H04N 19/423* | (2014.01) |
| *H04N 19/172* | (2014.01) |
| *H04N 19/137* | (2014.01) |

(52) U.S. Cl.
CPC ....... *H04N 5/23238* (2013.01); *H04N 19/105* (2014.11); *H04N 19/137* (2014.11); *H04N 19/172* (2014.11); *H04N 19/423* (2014.11)

(58) Field of Classification Search
CPC ............ H04N 5/23238; H04N 19/105; H04N 19/137; H04N 19/172; H04N 19/423
See application file for complete search history.

(56) References Cited

U.S. PATENT DOCUMENTS

| | | | |
|---|---|---|---|
| 10,571,926 B1* | 2/2020 | Zhang | G05D 1/0219 |
| 2009/0226113 A1* | 9/2009 | Matsumoto | G06K 9/00691 382/284 |
| 2012/0185094 A1* | 7/2012 | Rosenstein | G05D 1/0251 700/259 |
| 2014/0141803 A1* | 5/2014 | Marti | H04W 4/33 455/456.2 |
| 2017/0064515 A1* | 3/2017 | Heikkila | H04W 4/021 |
| 2017/0168488 A1* | 6/2017 | Wierzynski | G05D 1/0231 |
| 2018/0306587 A1* | 10/2018 | Holz | G01S 5/16 |

* cited by examiner

*Primary Examiner* — Sunghyoun Park
(74) *Attorney, Agent, or Firm* — Pierce Atwood LLP

(57) ABSTRACT

An autonomously motile device is capable of capturing image data, such as panoramic images, as it moves to different locations in an environment. It selects the locations at which to capture the image data by determining, for each of a plurality of grid units in a map of the environment, a number of grid points that are unobstructed by a wall or object surrounding the point. It then selects a number of locations having the greatest number of viewable grid points.

21 Claims, 24 Drawing Sheets

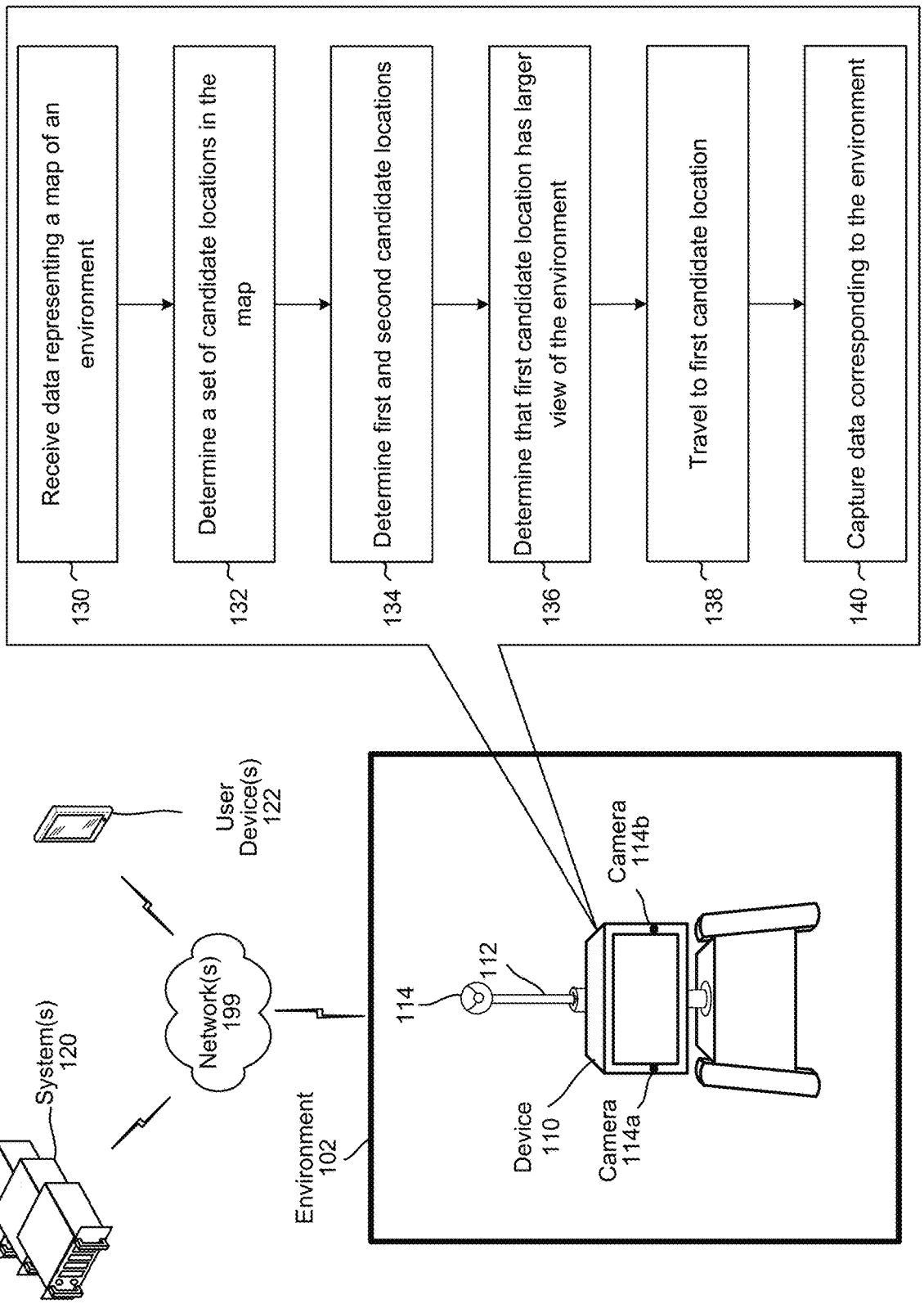

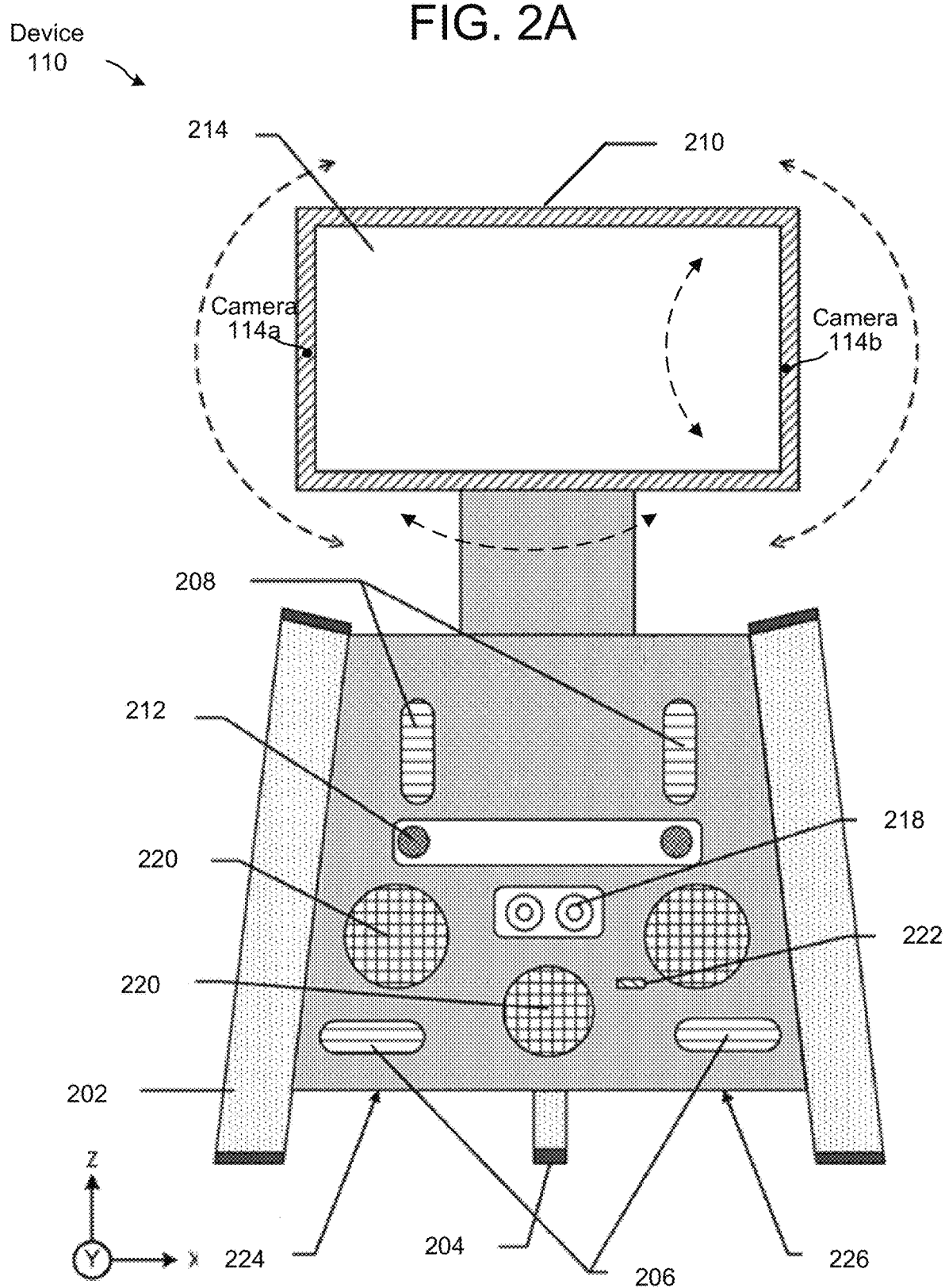

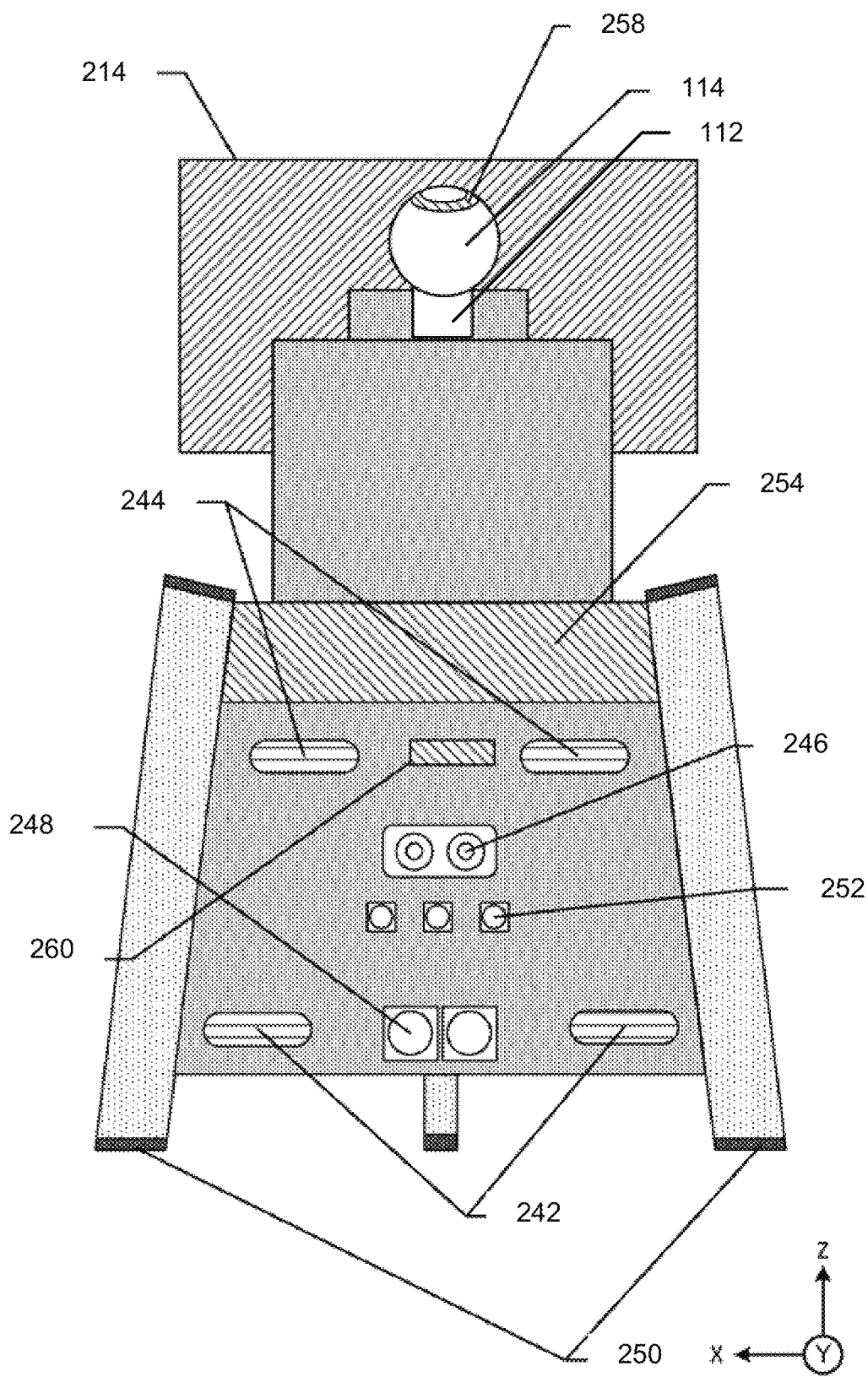

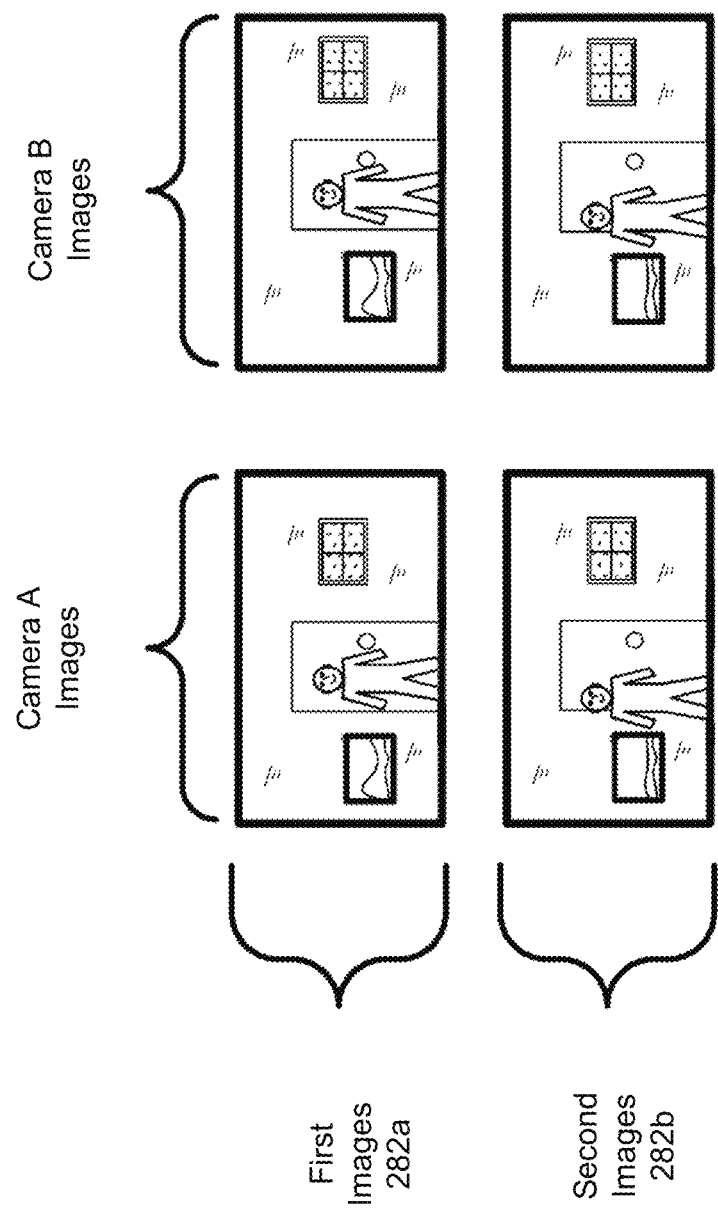

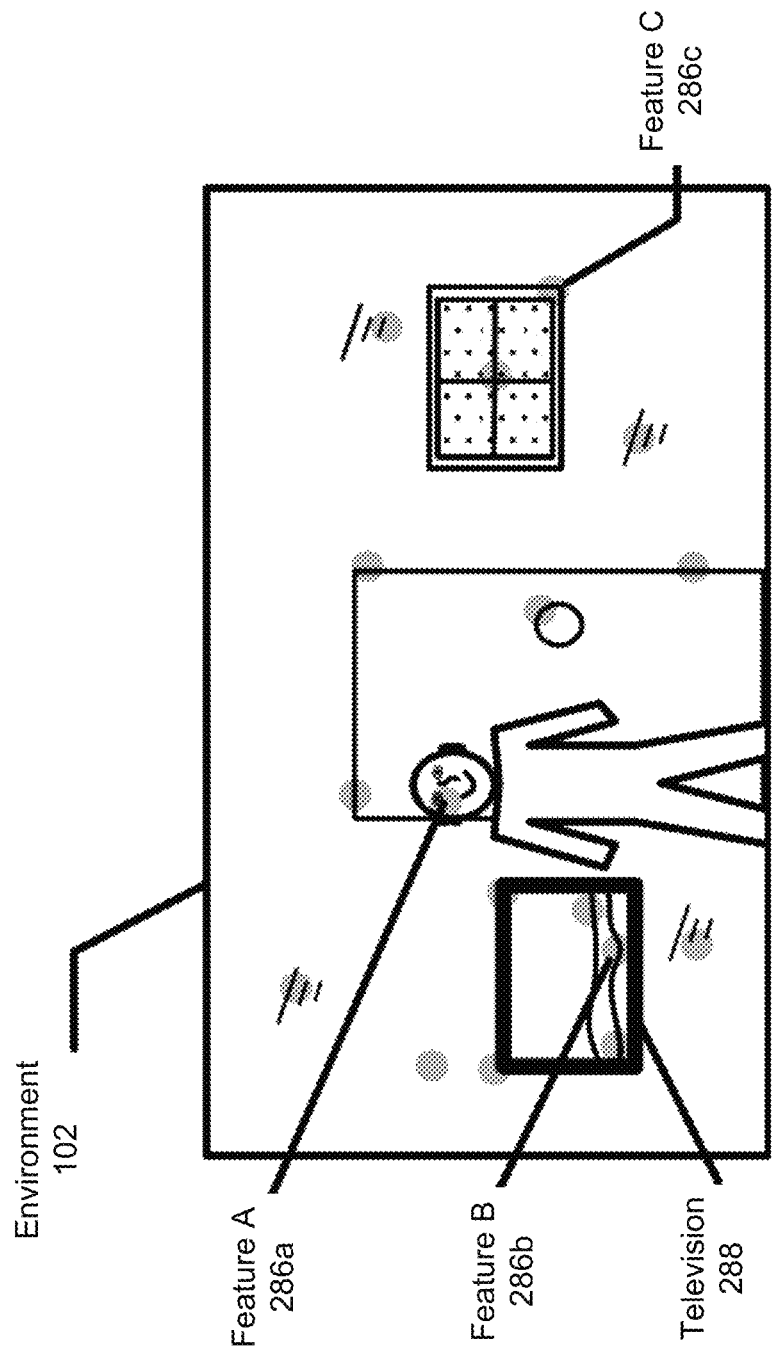

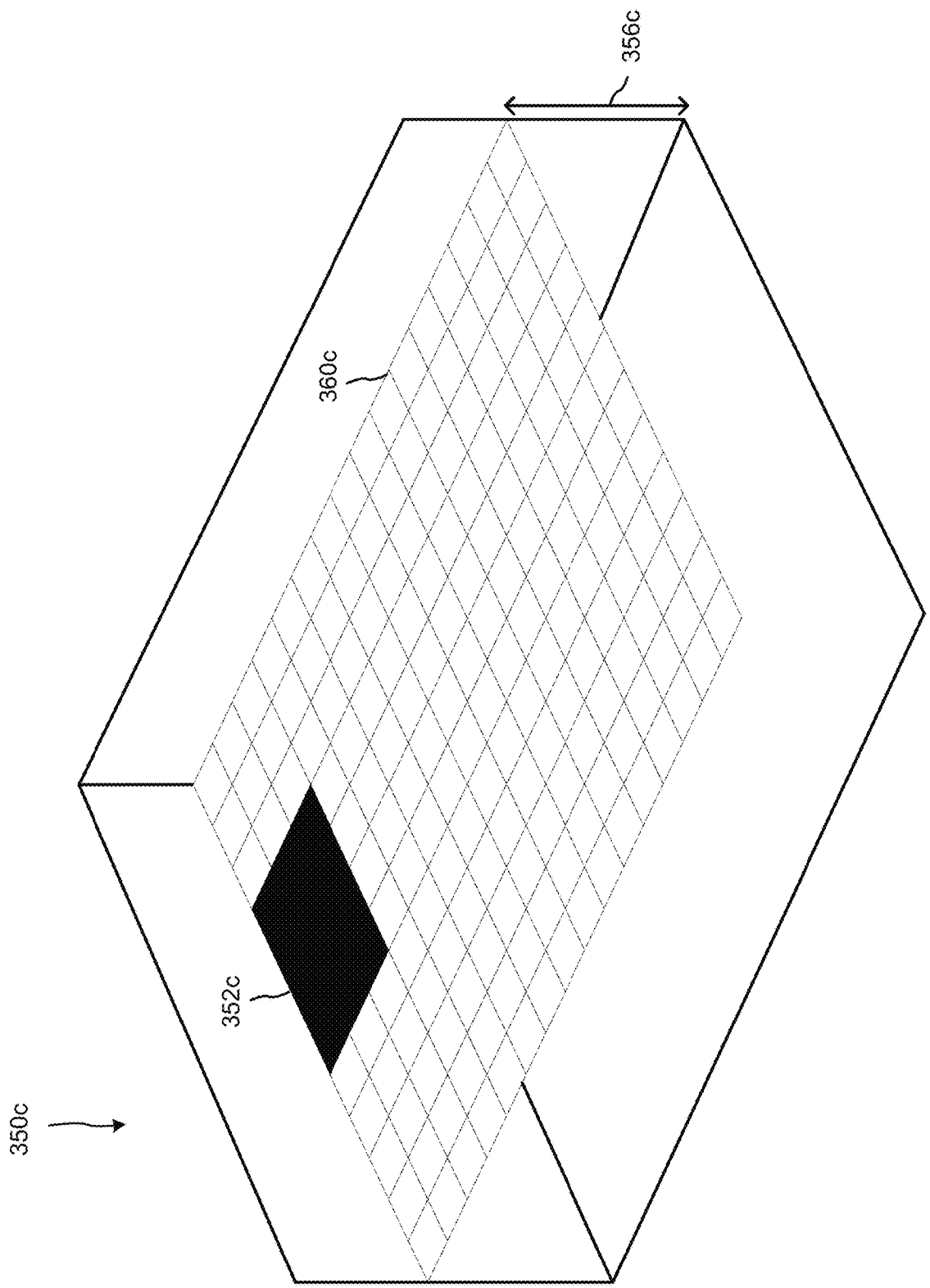

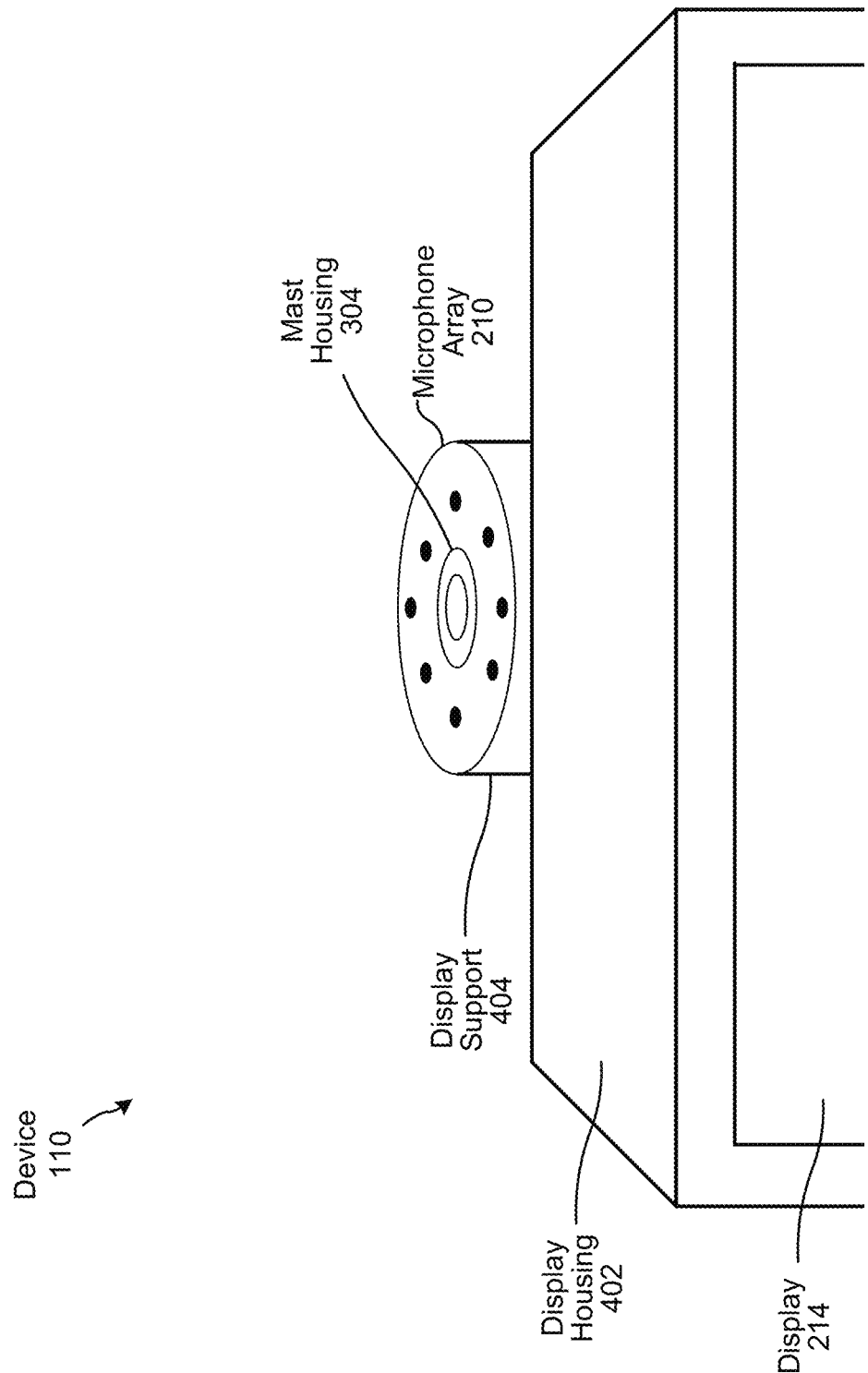

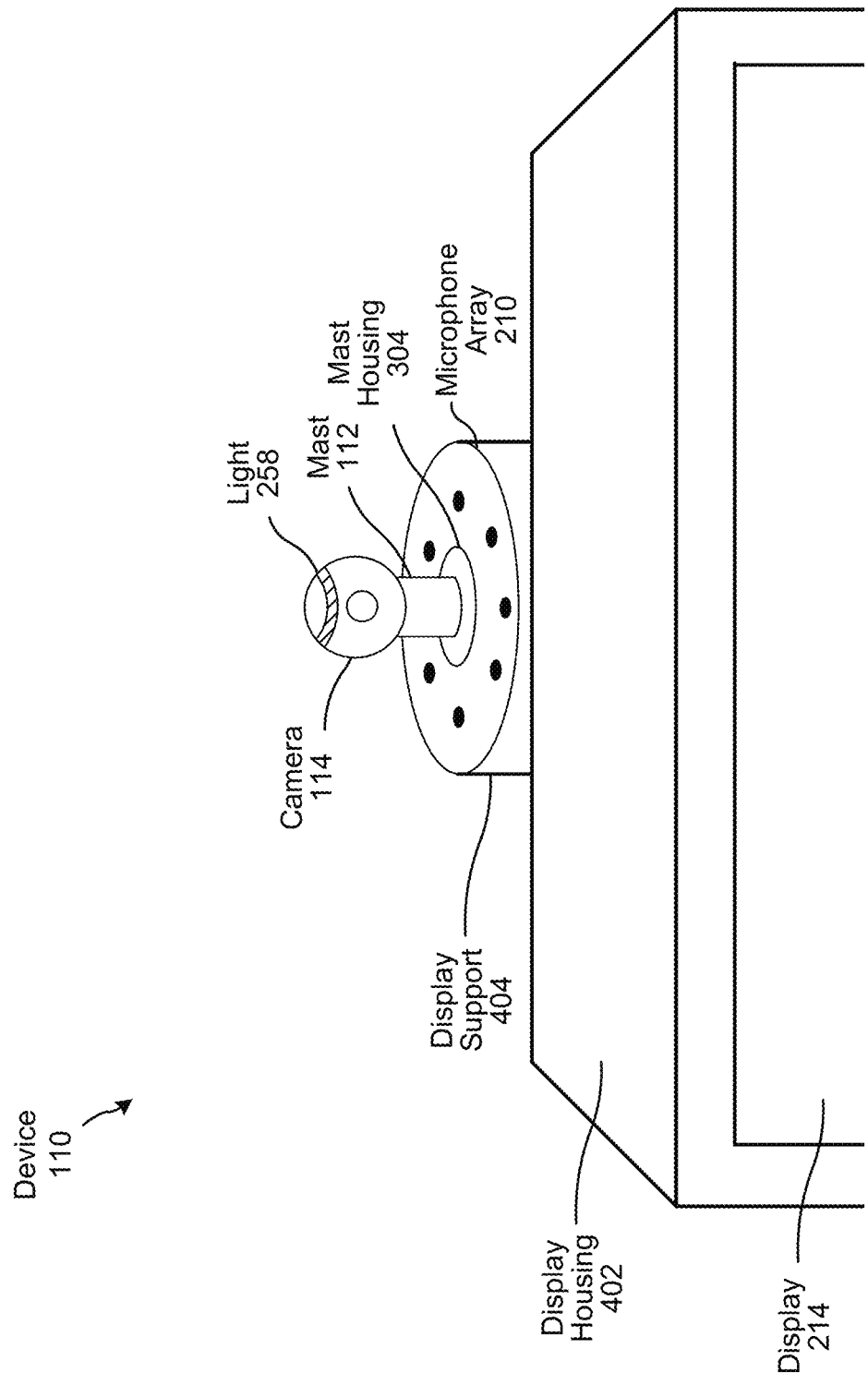

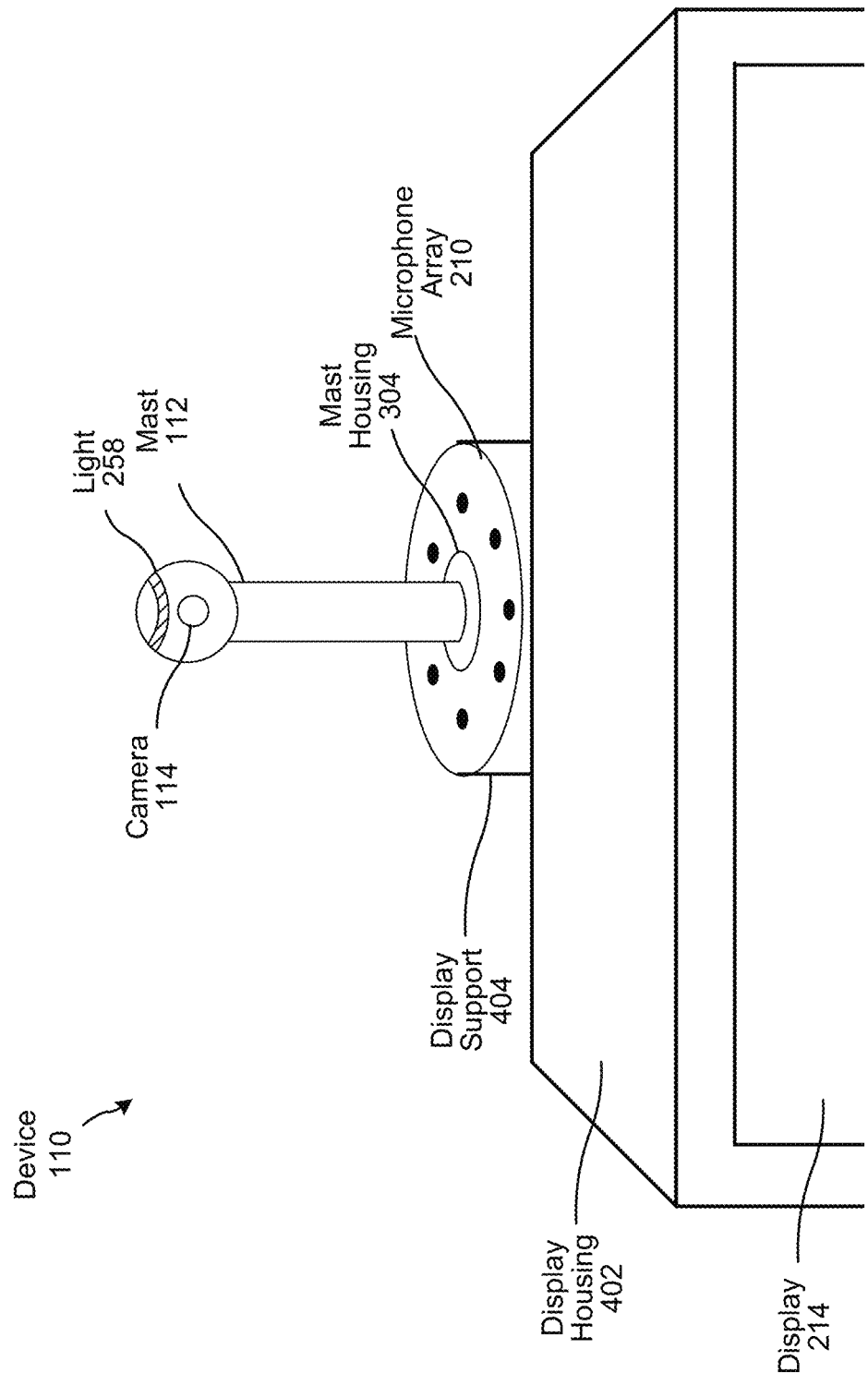

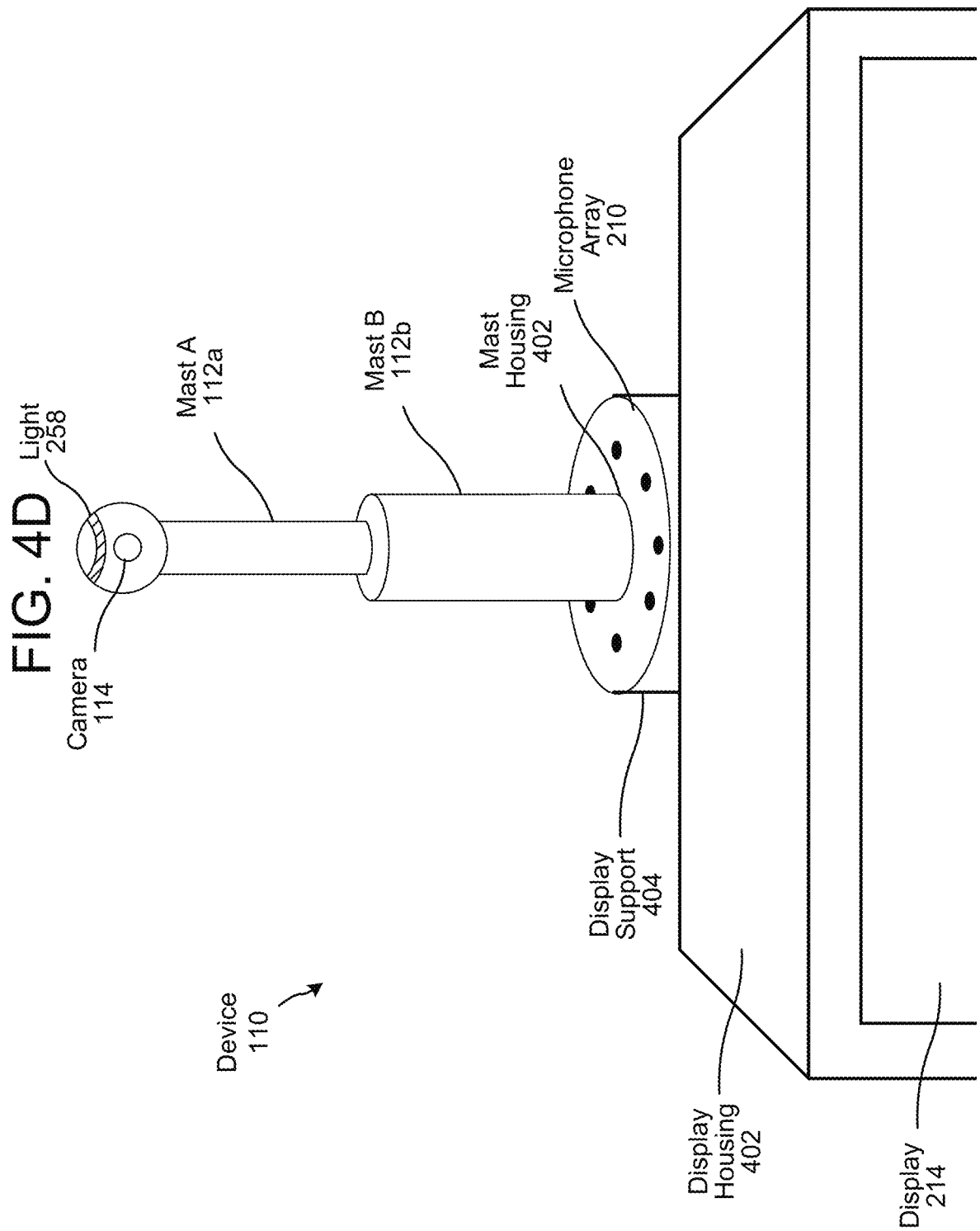

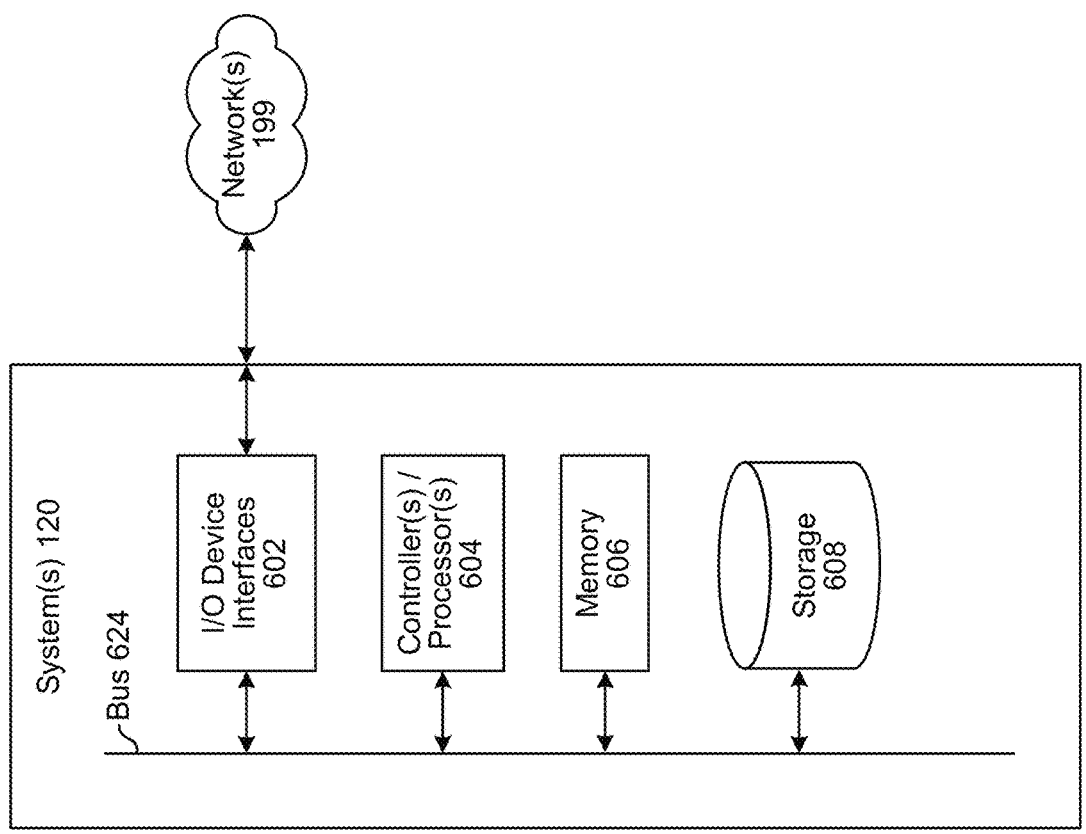

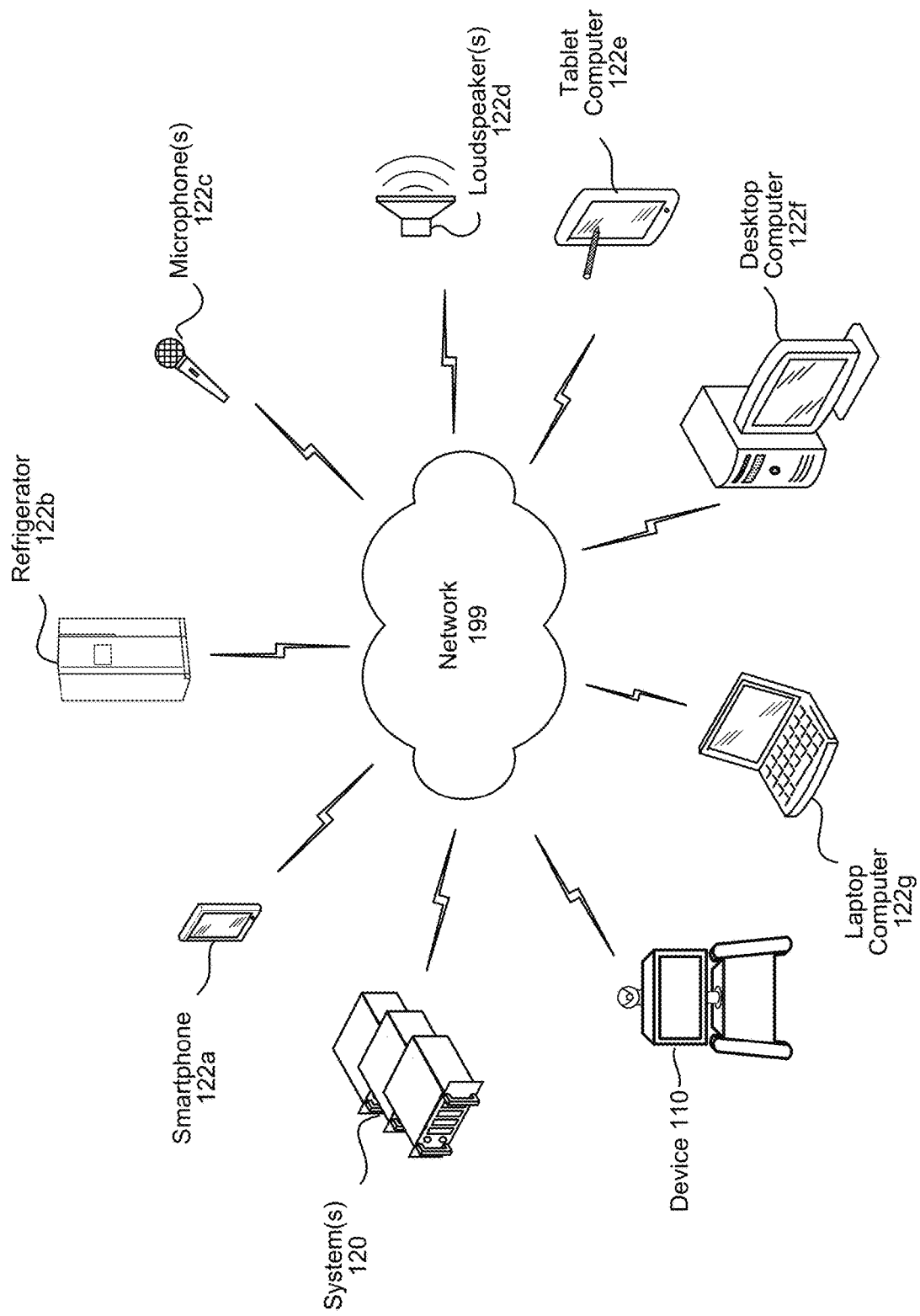

AUTONOMOUSLY MOTILE DEVICE WITH IMAGE CAPTURE

BACKGROUND

An autonomously motile device may be independently capable of moving within an environment. The autonomously motile device may further include one or more cameras that capture still and/or moving images. These images may be sent over a network to one or more user devices to allow the users of the devices to monitor the environment.

BRIEF DESCRIPTION OF DRAWINGS

For a more complete understanding of the present disclosure, reference is now made to the following description taken in conjunction with the accompanying drawings.

FIG. 1 illustrates a system and method for capturing images using an autonomously motile device according to embodiments of the present disclosure.

FIGS. 2A, 2B, and 2C illustrate views of an autonomously motile device according to embodiments of the present disclosure.

FIGS. 2E-2F illustrate images captured by an autonomously motile device in an environment according to embodiments of the present disclosure.

FIGS. 3A-3G illustrate maps of an environment of an autonomously motile device according to embodiments of the present disclosure.

FIGS. 4A-4D illustrate a movable component of an autonomously motile device according to embodiments of the present disclosure.

FIG. 6 illustrates components of a remote system according to embodiments of the present disclosure.

FIG. 7 illustrates a network of devices including an autonomously motile device according to embodiments of the present disclosure.

DETAILED DESCRIPTION

Figure 2B:
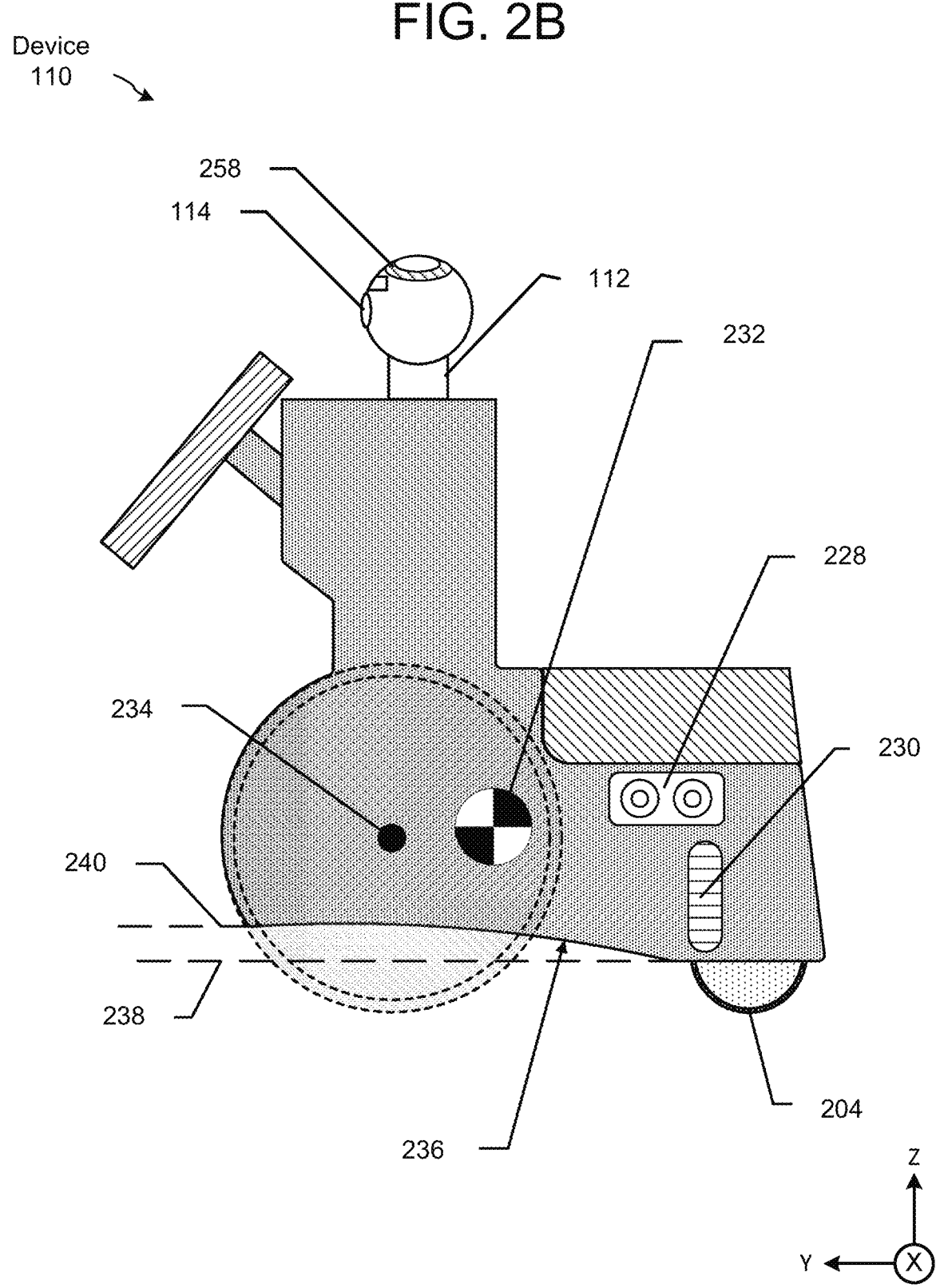

An autonomously motile device—e.g., a robot—may include, among other components, at least one camera capable of capturing still, panoramic, and/or moving images (e.g., video). The camera may be used for a variety of functions, such as video communication. The camera may be mounted on a moveable component, such as a mast, that moves (e.g., raises or lowers) the camera with respect to the device. The device may transmit captured images over a network to a user device, such as a cellular telephone or tablet computer, thus allowing a user of the user device to view the images.

In various embodiments, the autonomously motile device may move through its environment while capturing the images and thus capture one or more images that illustrate the environment. This movement may allow the device to capture a set of images that represents all or most of the environment. The set of images may thereafter be inspected by a user of a user device to allow said user to inspect a status of the environment. This inspection may be for the purposes of verifying the security of the environment, verifying a presence or absence of other people or pets in the environment, locating an object in the environment, determining a status of a person in the environment, or other such purposes. One or more of the set of images may be processed using a remote system for similar purposes using, for example, object recognition techniques. If the remote system determines that the set of images includes a representation of a certain person, object, and/or event, the remote system may send an indication of the representation to a user of a local device.

In order to ensure that the set of images includes a comprehensive representation of the environment, the autonomously motile device may process a map of the environment to determine one or more locations to which the autonomously motile device will travel (hereinafter a "travel location") and capture one or more images. In various embodiments, the autonomously motile device determines a set of candidate locations within the environment and selects one or more candidate locations as the locations at which to capture images. The autonomously motile device may, for each candidate location, determine a portion of the environment viewable at that candidate location. The viewable portion of the environment may be determined with respect to one or more still images captured as the camera of the autonomously motile device faces one or more directions at the candidate location, with respect to a panoramic image captured at the candidate location, and/or moving images captured at the candidate location. A panoramic image is an image captured as the camera rotates, pans, and/or tilts and may thus represent a wider field of view than a still image; for example, a still image captured by a camera may have a field of view of 60 degrees, while a panoramic image captured by that same camera may have a field of view of 180 or 360 degrees.

In some embodiments, the autonomously motile device ranks the candidate locations based on the size of their corresponding viewable areas. As explained in greater detail herein, the autonomously motile device may determine (or receive data corresponding to) a grid having a plurality of grid units (which may also be referred to as cells) for the map of the environment. The grid may be two- or three-dimensional; each grid unit or cell may be, for example, one meter on each side. The autonomously motile device may determine multiple horizontal two-dimensional grids for the map; each multiple grid may correspond to a different height. The autonomously motile device may then determine a number of grid units or cells on or adjacent to the candidate location that are unobscured by an obstruction, such as a wall, item of furniture, or other object.

The autonomously motile device may then first select a candidate location having a greatest number of corresponding grid units as the first travel location. If any other locations correspond to viewable grid units already represented by the grid units of the first travel location (hereinafter "overlapping" candidate locations), the autonomously motile device may eliminate those overlapping grid units from the list of grid units for other candidate locations and re-compute the number of grid units for each remaining candidate location. The autonomously motile device may continue selecting candidate locations as travel locations until all the candidate locations have been eliminated or selected, until a maximum number (e.g., 20) of travel locations are selected, and/or until a threshold amount (e.g., 90%) of all grid units are represented by the travel locations. The autonomously motile device may thereafter activate and travel to the travel locations, capture image(s) at each one, and transmit the captured images to a remote system and/or local device.

FIG. 1 illustrates an autonomously motile device 110 configured to capture image data, using a camera 114 which may be mounted on a mast 112, representing a viewable portion of an environment 102 in accordance with the present disclosure. The autonomously motile device 110 may further include cameras 114a, 114b mounted on a display. Although the figures and discussion of the present disclosure illustrate certain operational steps of a method in a particular order, the steps described may be performed in a different order (as well as certain steps removed or added) without departing from the intent of the disclosure. In various embodiments, the autonomously motile device 110 communicates with a system 120 and/or user device 122 using a network 199.

FIG. 1 illustrates a system that includes an autonomously motile device 110, which is described in greater detail below. In various embodiments, the autonomously motile device 110 may include a component disposed in a first position, such as that of a first configuration of the device 110a, and a component disposed in a second position, such as that of a second a configuration the device 110b. The component may be, but is not limited to, a mast 112. The autonomously motile device 110 may further be capable of autonomous motion using one or motors powering one or more wheels, treads, robotic limbs, or similar actuators, but the present disclosure is not limited to particular method of autonomous movement/motion. The device 110 may, for example, follow a user around a room to thereby allow the user easier access to features of the device 110, such as its voice interface.

The device 110 may further include one or more display screens for displaying information to a user and/or receiving touch input from a user. The device 110 may further include a microphone array 210 including one or more microphones and one or more loudspeakers; the microphone array 210 may be used to receive audio data, such as an utterance represented by user audio, from the user. The utterance may be, for example, a command or request. The loudspeaker of device 110 may be used to output audio to the user, such as audio related to a response to command or audio related to response to a request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user. The disclosure is not, however, limited to only these devices or components, and the device 110 may include additional components without departing from the disclosure.

In various embodiments, with reference to FIG. 1, the autonomously motile device 110 receives (130) data representing a map of an environment. The autonomously motile device determines (132) a set of candidate locations in the map. The autonomously motile device determines (134) a first candidate location in the set of candidate locations and a second candidate location in the set of candidate locations. The autonomously motile device selects (136) one of the first candidate location and the second candidate location as a location. The autonomously motile device travels (138) to the location and captures (130) image data representing a viewable area at the location.

FIGS. 2A-2C illustrate an autonomously motile device 110 according to various embodiments of the present disclosure. Referring first to FIG. 2A, the device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

One or more cameras 212 may be mounted to the front of the device 110; two cameras 212 may be used to provide for stereo vision. The distance between two cameras 212 may be, for example, 5-15 centimeters; in some embodiments, the distance is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

Cameras 212 used for navigation may be of different resolution from, or sensitive to different wavelengths than, other cameras 114 used for other purposes, such as video communication. For example, navigation cameras 212 may be sensitive to infrared light allowing the device 110 to operate in darkness or semi-darkness, while a camera 114 mounted on a mast 112 may be sensitive to visible light and may be used to generate images suitable for viewing by a person. A navigation camera 212 may have a resolution of at least 300 kilopixels each, while the camera 114 mounted on the mast 112 may have a resolution of at least 10 megapixels. In some implementations, navigation may utilize a single camera 212.

The cameras 212 may operate to provide stereo images of the environment, the user, or other objects. For example, an image from the cameras 212 may be accessed and used to generate stereo-image data corresponding to a face of a user. This stereo-image data may then be used for facial recognition, user identification, gesture recognition, gaze tracking, and other uses.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another. An ultrasonic sensor 218 may be mounted on the front of the device 110 and may be used to provide sensor data that represents objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the front and/or underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated; the right side may include similar features. The mast 112 is extended to a first position; a camera 114 is disposed at an upper end of the mast 112. An ultrasonic sensor 228 and an optical sensor 230 may be disposed on either side of the device 110. The camera 114 may be capable of rotation, panning, and tilting, and may capture a panoramic image.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster is shown in a trailing configuration, in which the caster is located behind or aft of the wheel axle 234 and the center of gravity 232. In another implementation (not shown) the caster may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within a lower structure of the device 110. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 112, which may include a camera 114 and a light 258.

Figure 2D:
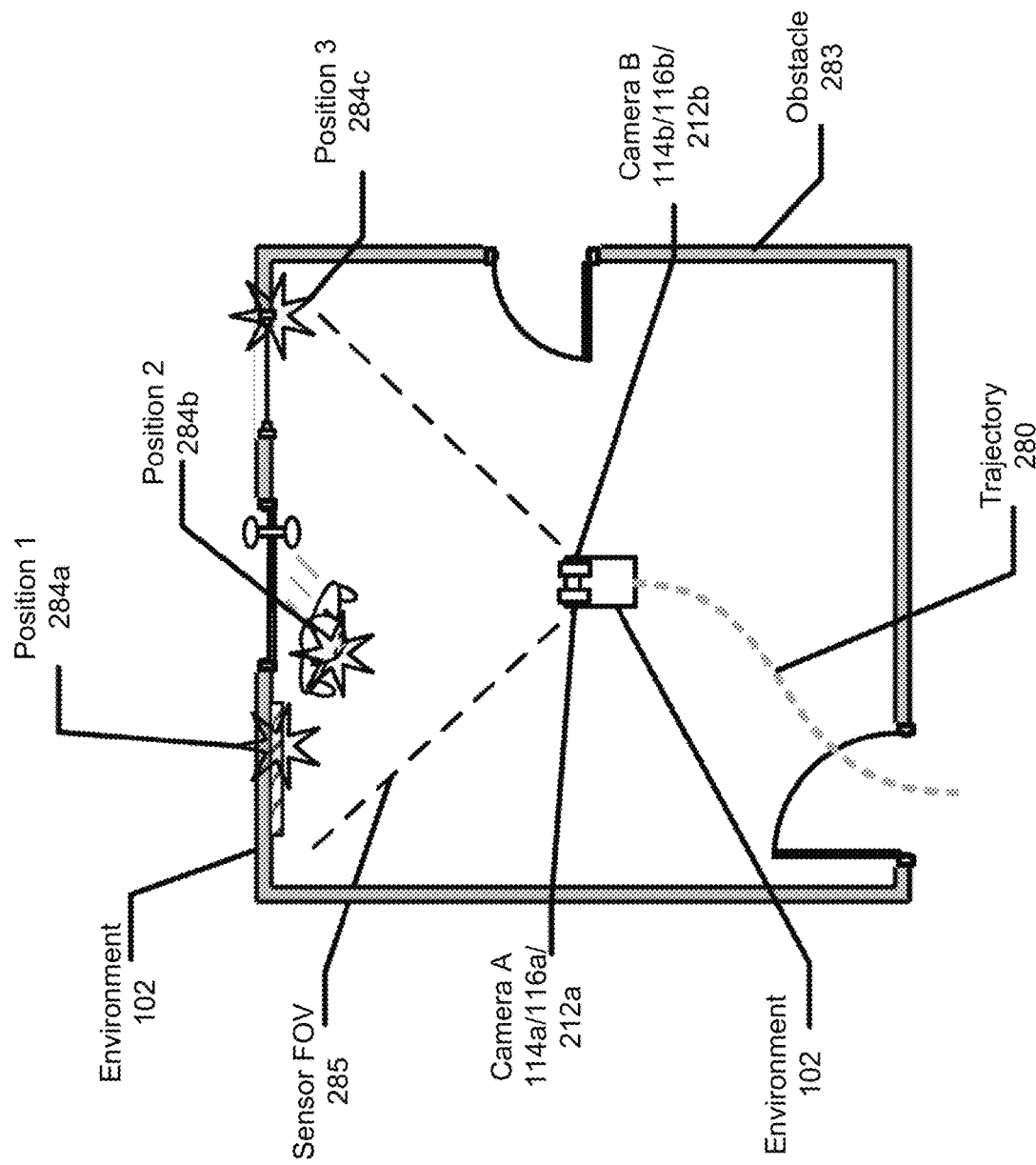
FIG. 2D illustrates a view of an autonomously motile device in an environment according to embodiments of the present disclosure.

As shown in FIG. 2D, The autonomously motile device 110 may move in the environment 102. The motion of the autonomously motile device 110 may be described as a trajectory 280, as shown in FIG. 2D. In some implementations, the trajectory 280 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 102 to another. For example, a motor may be used to drive a wheel attached to a chassis of the autonomously motile device 110, which causes the autonomously motile device 110 to move. The autonomously motile device 110 may turn, move forward, move backward, and so forth.

In another example, actuators may move legs allowing the autonomously motile device 110 to walk.

Figure 5A:
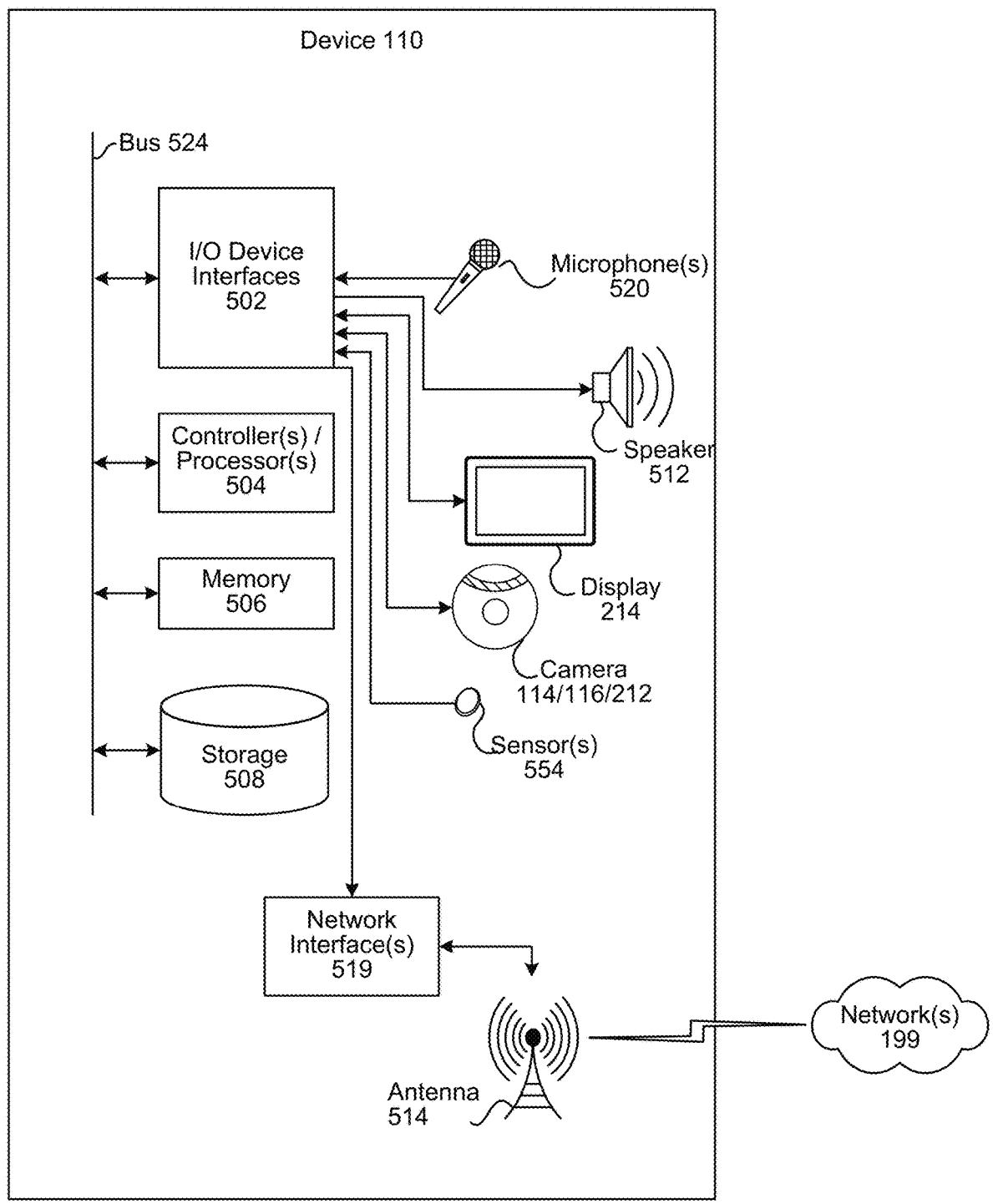
FIG. 5A illustrates components of an autonomously motile device according to embodiments of the present disclosure.

The autonomously motile device 110 may include one or more sensors 554 (shown below in FIG. 5D). For example, the sensors 554 may include a first camera 114*a*/116*a*/212*a*, a second camera 114*b*/116*b*/212*b*, an inertial measurement unit (IMU) 580, microphones, time-of-flight (TOF) sensors, and so forth. The first camera 114*a*/116*a*/212*a* and the second camera 114*b*/116*b*/212*b* may be mounted to a common rigid structure that maintains a relative distance between the cameras 114/116/212. An IMU 580 may be attached to this common rigid structure, or one of the cameras affixed thereto. The first camera 114*a*/116*a*/212*a* and the second camera 114*b*/116*b*/212*b* may be arranged such that a sensor field-of-view (FOV) 285 of the first camera 114*a*/116*a*/212*a* overlaps at least in part a sensor FOV of the second camera 114*b*/116*b*/212*b*. The sensors 554 may generate sensor data 547 (which may be stored in storage 508 as illustrated in FIG. 5C discussed below). The sensor data 547 may include image data 542 acquired by the first camera 114*a*/116*a*/212*a* and the second camera 114*b*/116*b*/212*b*. For example, as shown in FIG. 2E, a pair of images 282 may comprise image data 542 from the first camera 114*a*/116*a*/212*a* and the second camera 114*b*/116*b*/212*b* that are acquired at the same time. For example, a first pair of images 282*a* are acquired at time $t_1$ and a second pair of images 282*b* are acquired at time $t_2$. The sensors 554 are discussed in more detail with regard to FIG. 5D.

During operation the autonomously motile device 110 may determine input data. The input data may include or be based at least in part on sensor data 547 from the sensors 554 onboard the autonomously motile device 110. In one implementation, a speech processing component 537 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

Figure 5B:
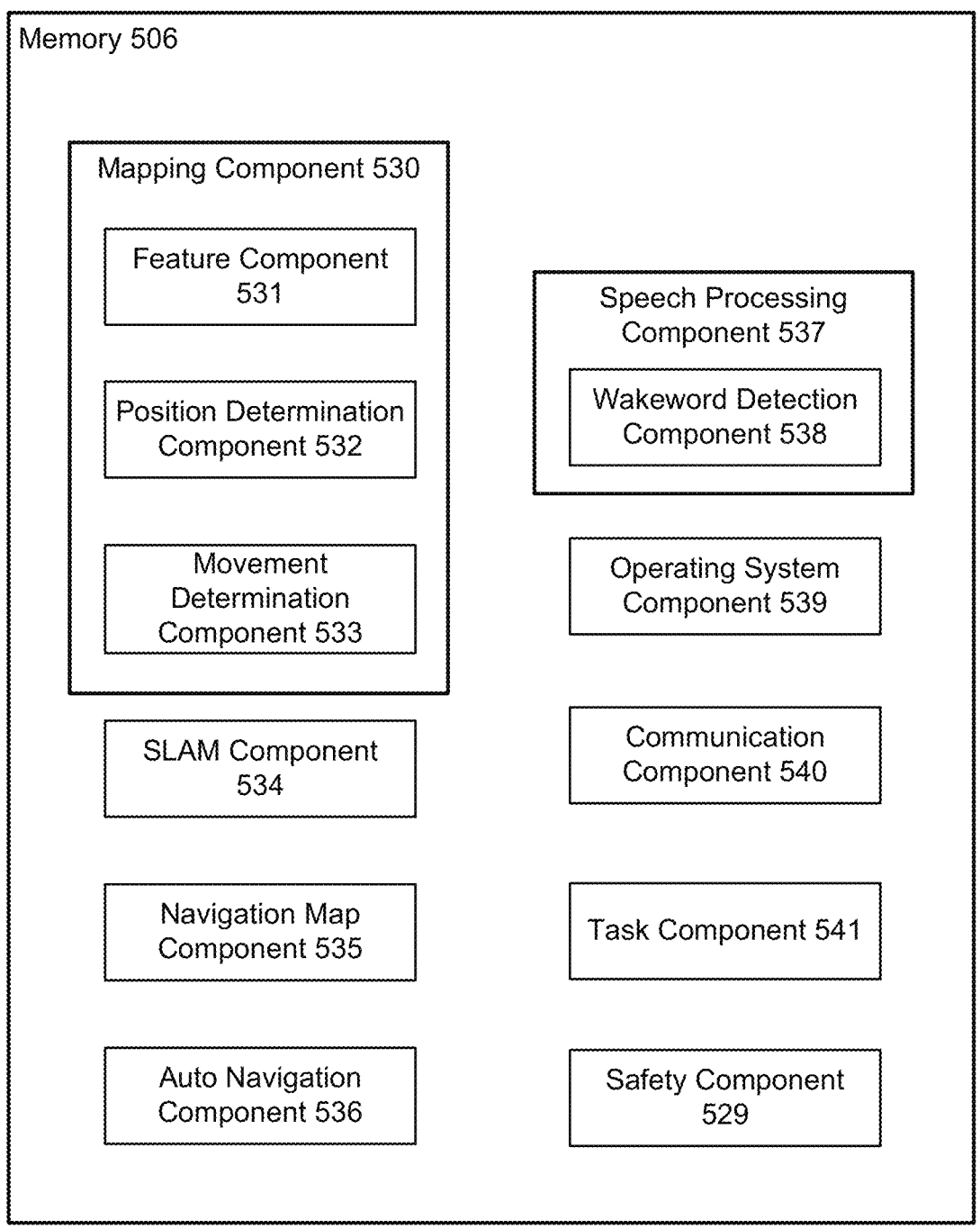
FIG. 5B illustrates components that may be stored in a memory of an autonomously motile device according to embodiments of the present disclosure.
Figure 5C:
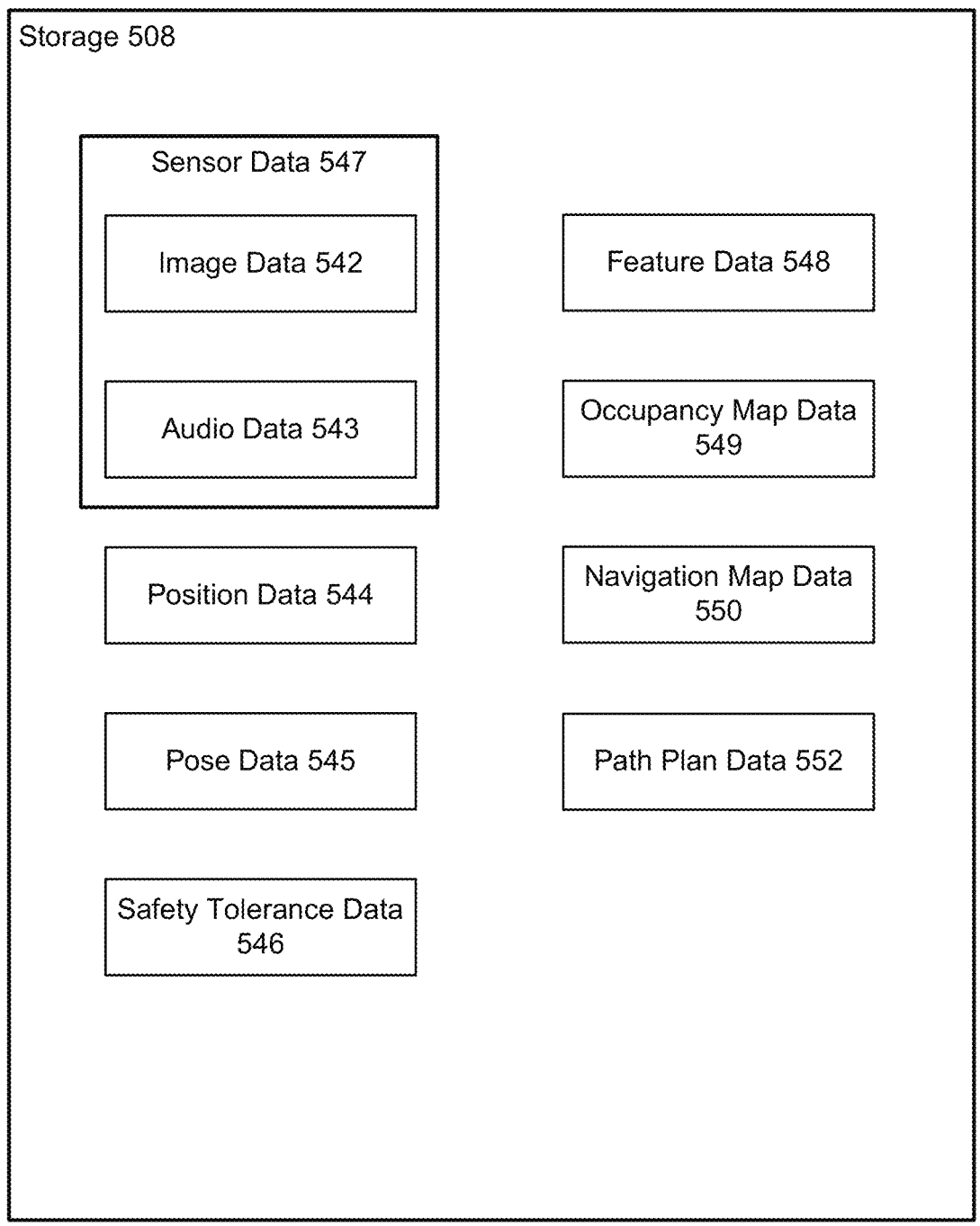
FIG. 5C illustrates data that may be stored in a storage of an autonomously motile device according to embodiments of the present disclosure.

A mapping component 530 (which may be included in memory 506 as illustrated in FIG. 5B further discussed below) determines a representation of the environment 102 that includes the obstacles 283 and their location in the environment 102. During operation the mapping component 530 uses the sensor data 547 from various sensors 554 to determine information such as where the autonomously motile device 110 is, how far the autonomously motile device 110 has moved, the presence of obstacles 283, where those obstacles 283 are, and so forth.

A feature module processes at least a portion of the image data 542 to determine first feature data 548. The first feature data 548 is indicative of one or more features 286 that are depicted in the image data 542. For example, as shown in FIG. 2F, the features 286 may be edges of doors, shadows on the wall, texture on the walls, portions of artwork in the environment 102, and so forth. The environment 102 may include display devices that are capable of changing the images they portray. For example, a television 288 may be presented in the environment 102. The picture presented by the television 288 may also have features 286.

Various techniques may be used to determine the presence of features 286 in image data 542. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 286 in the image data 542. A feature 286 that has been detected may have an associated descriptor that characterizes that feature 286. The descriptor may comprise a vector value in some implementations. For example, the descriptor may comprise data indicative of the feature with respect to 256 different dimensions.

The first feature data 548 may comprise information such the descriptor for the feature 286, the images that the feature 286 was detected in, location in the image data 542 of the feature 286, and so forth. For example, the first feature data 548 may indicate that in a first image the feature 286 is centered at row 994, column 312 in the first image. These data and operations, along with those discussed below, may be used by the autonomously motile device 110, and/or other devices, to perform the operations described herein.

Figure 3A:
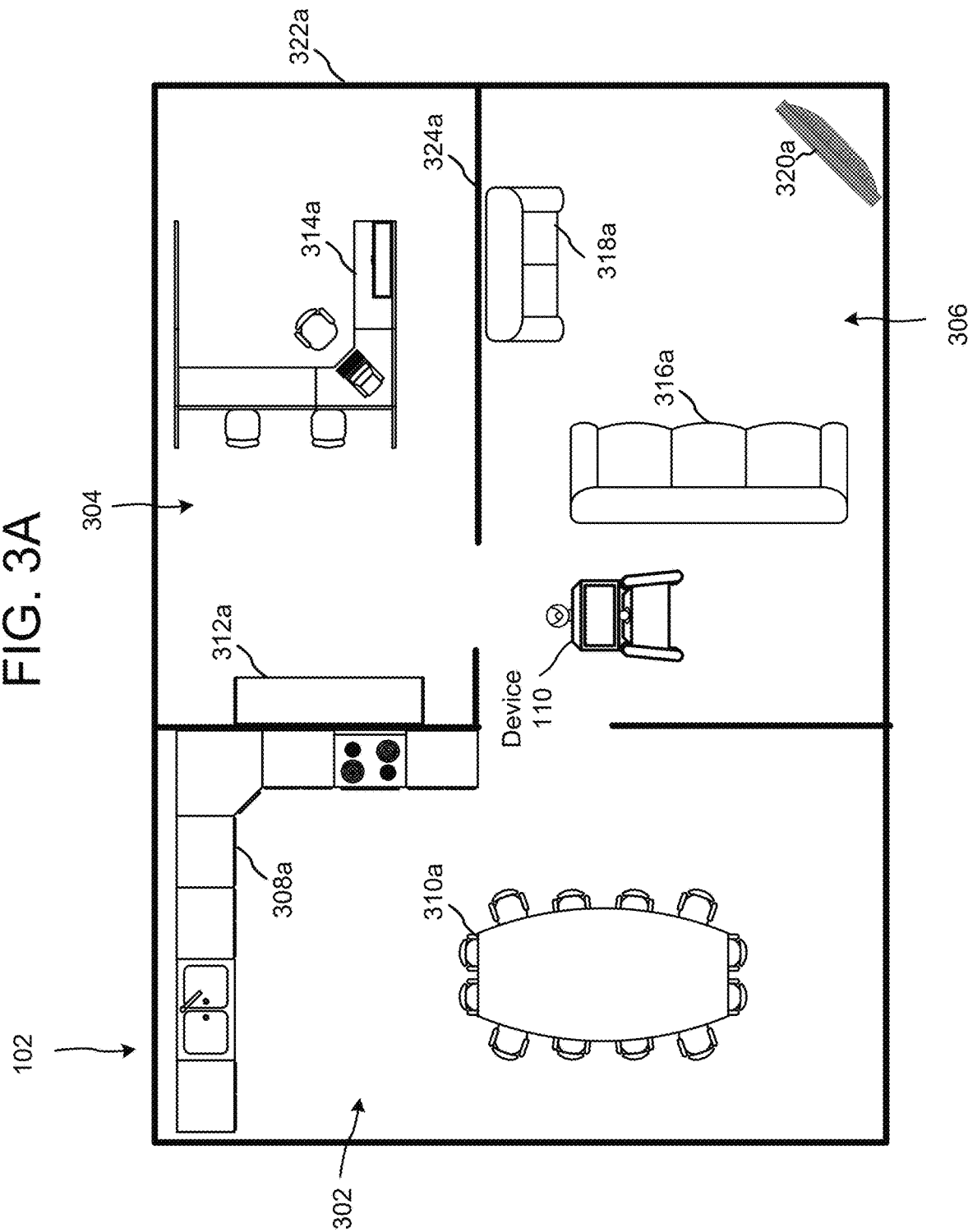

FIGS. 3A-3G illustrates a representation of one example of an environment 102 of an autonomously motile device 110 according to embodiments of the present disclosure. The device may be disposed at a location in the environment 102. The device 110 may have a certain orientation at the location and may have a certain arrangement of external components (e.g., mast height, display rotation, etc.); this orientation and arrangement may be collectively referred to as the pose of the device 110. Referring first to FIG. 3A, an example environment 102 includes three rooms 302, 304, 306. A first room 302 includes a kitchen countertop 308*a* and a table and chairs 310*a*. A second room 304*a* includes bookshelves 312*a* and a desk 314*a*. A third room 306*a* includes a sofa 316*a*, a loveseat 318*a*, and a wall-mounted television 320*a*. In this example environment 102, some objects (such as sofa 316*a*) extend from the floor of the environment 102 to a point between the ceiling and the floor; some objects (such as the television 320*a*) do not touch the floor; and other objects (such as bookshelves 312*a*) extend from floor to ceiling. The environment is bordered by exterior walls 322*a* and may include one or more interior walls 324*a*. The device 110 is capable of movement, as disclosed herein, within the environment 102. Environments 102, however, having any number of rooms and/or any types of objects are within the scope of the present disclosure.

Figure 3B:
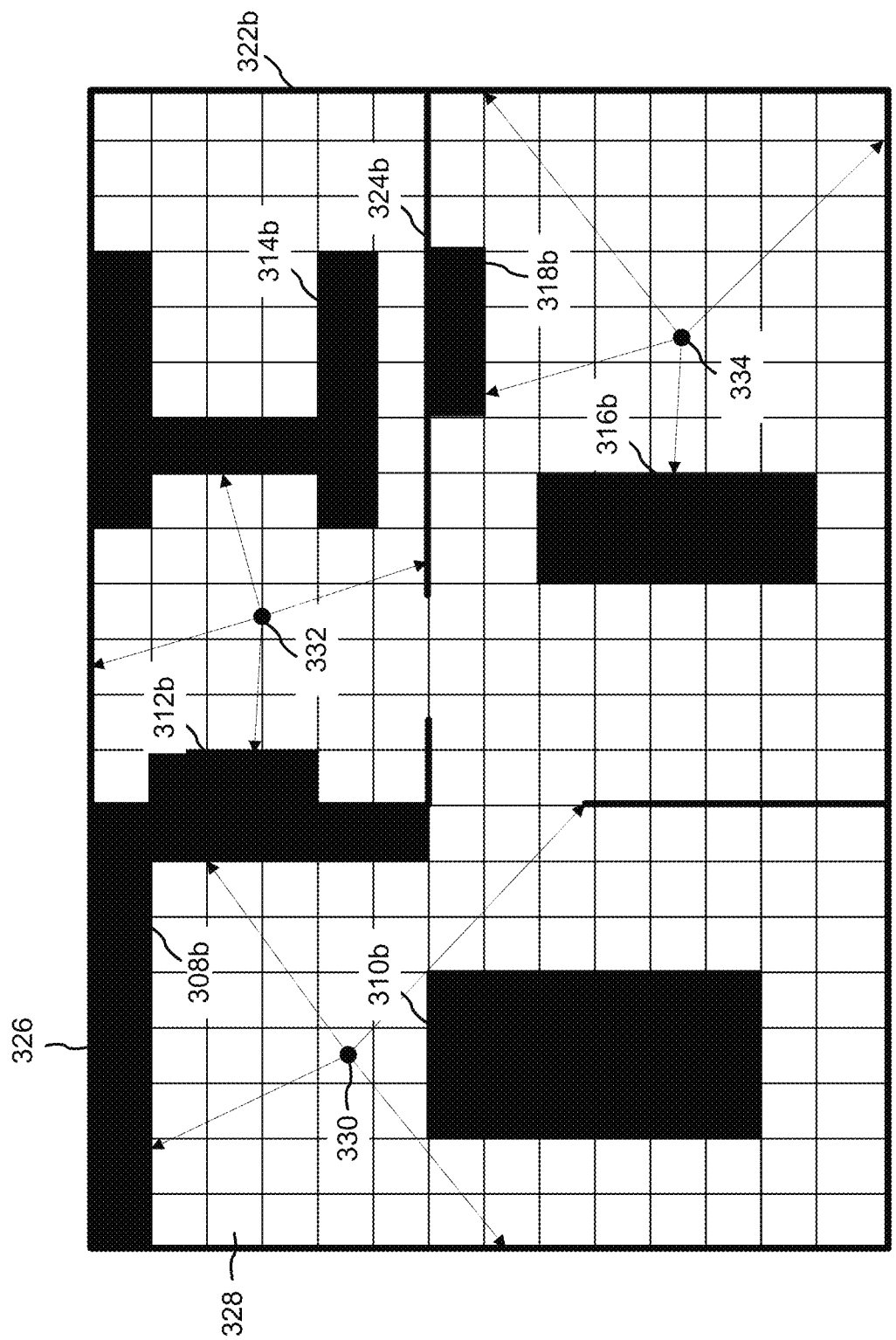

FIG. 3B illustrates an occupancy map 326 of the environment 102. The device 110 may generate the occupancy map 326 or may receive the occupancy map 326 from the system 120. The occupancy map 326 includes data representing the position 322*b* of exterior walls 322*a* and data representing the position 324*b* of interior walls 324*a*. The occupancy map data may be a set of (x,y) coordinates that indicate the positions 322*b*, 324*b* of the walls 322*a*, 324*a* with respect to a (0,0) origin point, such as a bottom-left point of the map 326. For example, if an exterior wall 322*a* extends from the (0,0) origin point to a point 10 meters to the right, the occupancy map data may include the coordinates (0,0)—(10,0).

The occupancy map 326 may further include data representing the positions 308*b*, 310*b*, 312*b*, 314*b*, 316*b*, 318*b* of the objects 308*a*, 310*a*, 312*a*, 314*a*, 316*a*, 318*a*. The data representing the positions 308*b*, 310*b*, 312*b*, 314*b*, 316*b*, 318*b* may similarly be a set of further (x,y) coordinates that represent the position and size of each object 308*a*, 310*a*, 312*a*, 314*a*, 316*a*, 318*a* in the environment 102 with respect to the (0,0) origin point. For example, if the sofa 316 has dimensions of 1 meter by 0.5 meters, and if it is positioned such that its lower-left corner is disposed at the grid point (10,1), the data representing its position may be (10,1)×(10.5, 2), denoting its lower-left corner and upper-right corner. Objects having more complicated shapes (with more than four sides) may be represented by additional sets of (x,y) coordinates, such that each pair of (x,y) coordinates defines a side of the object. Objects having curved or otherwise more complicated sides may be represented by data defining the curve, such as parameters defining an arc segment, or may be estimated as a set of straight lines. Each cell may have an obstacle value representing whether that cell corresponds to an obstruction; the value may be 1 for an obstruction and 0 for no obstruction. In the real world, the obstacle value is representative of whether a particular location, area, etc. is navigable or not by the autonomous motile device. For example, if a particular cell in the occupancy map has an obstacle value of '1', then the area in the real world/physical space corresponding to that particular cell is likely not navigable as it might have some physical obstruction such a piece of furniture. The nature of the obstruction can be temporary, e.g., a human standing at a location, or long-term, e.g., a dining table. The device 110 may determine presence or absence of an obstruction in a cell or group of cells by using the obstacle value; if the obstacle value is '1,' the device 110 determines that the cell is no navigable.

The device 110 and/or system 120 may determine the occupancy map 326 by processing input data, such as image data received from the camera 114 or infrared data received from one or more cameras 212. The device 110 may move within the environment 102 while it captures the image data. In some embodiments, device 110 and/or system 120 processes the image data using image-processing techniques to determine objects therein and then determines the position data based thereon. For example, if the device 110 captures image data that includes a representation of the sofa 316a, the device 110 and/or system 120 may determine, based on a likely size of the sofa 316a, how far the sofa 316 is from the device 110 and base the (x,y) coordinates of the representation of the sofa 316b thereon. In other embodiments, the device 110 and/or system 120 uses the multiple cameras 212 to capture binocular images of the environment 102 and, based on a known distance between the multiple cameras 212, determines the distance between the device 110 and an object depicted in the binocular images. Any method of determining the coordinates of the positions 322b, 324b of the walls 322a, 324a and the positions 308b, 310b, 312b, 314b, 316b, 318b of the objects 308a, 310a, 312a, 314a, 316a, 318a is within the scope of the present disclosure.

The map data may further include a grid made up of grid units 328. If the map data does not include the grid, the device 110 may create the grid. Each grid unit may have dimensions of any size, such as 100 centimeters length and width. The grid units need not be square and need not be all the same size; they may be, for example hexagonal. The system 120 and/or device 110 may create the grid by beginning at the (0,0) origin point and placing grid tiles adjacent in the positive x- and y-dimensions. In other embodiments, the system 120 and/or device 110 may determine the length and width of each grid unit by determining the length and width of the map 326 and/or rooms 302, 304, 306 and dividing by an integer, such as ten, so that no fractionally-sized grid units 328 are needed to fully populate the map 326 with the grid units 328.

The system 120 and/or device 110 may then determine one or more candidate locations in the occupancy map 326, such as the candidate locations 330, 332, 334 depicted in FIG. 3B. The candidate locations may be determined by determining a center point of each grid unit 328. The candidate locations may instead or in addition be at elsewhere in each grid unit 328 or on a border of each grid unit 328, such as a vertex of each grid unit 328. In some embodiments, the number of candidate locations is the same as the number of grid units 328; in other embodiments, the number of candidate locations differs from the number of grid units 328. There may be, for example, one candidate location for every two grid units 328 or two candidate locations per grid unit 328. In other embodiments, the candidate locations are determined without reference to any grid unit 328 and may be placed, for example, such that each candidate location is a predetermined distance from others, such as 1 meter. Parts of the map 326 that are not obstructed but that are unreachable by the device 110 may not be considered candidate locations. Furthermore, a user may indicate that no candidate locations should be placed in certain rooms (e.g., blacklisting one or more rooms) or that candidate locations should only be placed in certain rooms (e.g., whitelisting one or more rooms).

For each candidate location, the system 120 and/or device 110 may determine a viewable area corresponding to that candidate location. The viewable area may be an area of the occupancy map 326 that, were the device 110 positioned at the candidate location, is capable of being input as image data to the device 110. The viewable area may be found by rotating a line segment that is fixed at one end at the candidate location through 360 degrees around the candidate location; the other end of the line segment, as it rotates, terminates when it reaches an obstruction, such as a wall 322b or object 308. Any area of the map 326 (other than an obstruction) that the line segment intersects as it rotates may be the viewable area. In some embodiments, the line segment has a maximum length (e.g., five meters) to account for non-obstructed portions of the map 326 that are too far from the candidate location to be viewable (e.g., too far for the camera 114 to accurately resolve). With reference to FIG. 3B, the viewable area may be quantified by counting a number of grid units 328 that the line segment intersects as it rotates. In other embodiments, the viewable area may be quantified by determining the area (in, e.g., square meters) that the line segment intersects.

In some embodiments, the line segment rotates through 360 degrees. In other embodiments, the system 120 and/or device 110 rotates the line segment through some number of degrees less than 360 degrees, such as 180 degrees. The begin and endpoints of the rotation (e.g., the particular degrees that, with respect to the candidate location, at which the line segment begins and ends to rotate) may be determined randomly; a number of rotations, each with different begin and endpoints, may be performed at each candidate location, and the quantified viewable area may be determined by the rotation that yields the greatest viewable area. In other embodiments, the begin- and endpoints are determined such that the rotation is on the opposite side of the device 110 from a nearest wall or obstruction.

The system 120 and/or device 110 may weigh the quantified viewable area of each candidate location using one or more of a number of weight types. Each weight may be a value that is multiplied by the quantified viewable areas to determine a weighted quantified viewable area for each candidate location. As described herein, the weights may range from 0.0 (to set the weighted quantified viewable area to zero) through 2.0 (to double the weighted quantified viewable area). Any range of weight values is within the scope of the present disclosure, however. The ranges may further vary based on the weight type.

One weight type is a doorway weight that represents how close the device 110 is to a doorway in a wall 322a, 324a. The doorway weight may be determined by measuring a distance (in, e.g., meters) between the candidate location and a nearest doorway. The doorway weights may be normalized across the weighted quantified viewable areas so that the weighted quantified viewable areas fall within a range (e.g., 0.0-2.0). A doorway weight may increase a quantified viewable area when the device 110 is closer to a door (e.g., make it more likely that a candidate location near a doorway is selected) or may decrease a quantified viewable area when the device 110 is closer to a door (e.g., make it less likely that a candidate location near a doorway). Similar weights may be determined and used to generate the weighted quantified viewable areas; for example, a window weight may be applied based on how close the device is to a window, an wall weight may be applied based on how close the device is to an exterior wall 322b and/or interior wall 324b; and/or an object weight may be applied based on how close the device is to an object, such as the sofa 316b.

A presence weight may be determined based on whether a human is present in a room 302, 304, 306. The presence weight may be, for example, less than 1.0 for a room in which a human is present and greater than 1.0 for a room in which a human is not present. A weighted quantified viewable area modified with the presence weight will thus be biased against occupied rooms.

Once the quantified viewable areas (and/or weighted quantified viewable areas) are determined for each candidate location, a number of the candidate locations may be selected as one or more travel locations. In some embodiments, a number (e.g., one, two, or three) candidate location(s) having the highest quantified viewable area is selected in each room 302, 304, 306. In other embodiments, a number (e.g., one, two, or three) candidate location(s) having the highest quantified viewable area is selected across the whole map 326 (e.g., the selection process does not consider which candidate location is in which room).

In some embodiments, the device 110 and/or system 120 selects a first candidate location having the largest associated quantified viewable area. The device 110 and/or system 120 then removes grid units 328 in the associated viewable area from the rest of the viewable areas for the other candidate locations and re-computes the corresponding quantified viewable areas (and/or weighted quantified viewable areas). The device 110 and/or system 120 may then select a second candidate location having the largest associated quantified viewable area from the set of re-computed quantified viewable areas. The device 110 and/or system 120 may repeat this process—selecting the largest quantified viewable areas, removing associated grid units 328, and re-computing the quantified viewable areas—until no more candidate locations remain, until a maximum number (e.g., 20) of travel locations are determined, and/or until the selected travel locations correspond to a number of grid units 328 greater than a threshold percentage (e.g., 90%) of the total number of grid units 328.

Figure 3C:
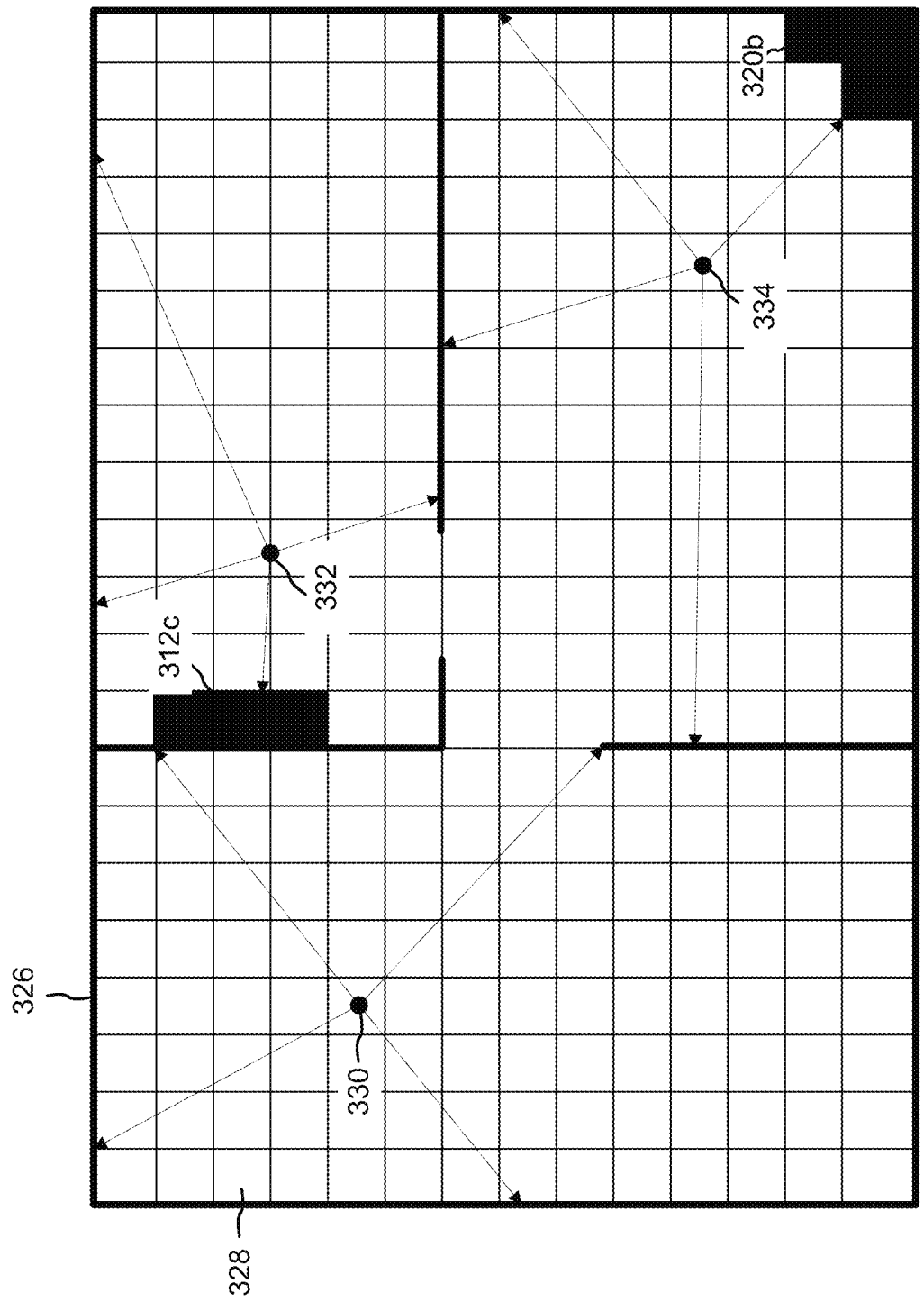

FIG. 3C illustrates a second map 340 that represents an elevation in the environment 102 different from that of the first map 326 described above. The first height of the first map 326 may be closer to the floor of the environment 102 (e.g., 500 centimeters above the floor), while the second height of the second map 340 may be closer to the ceiling (e.g., two meters from the floor). Some objects below the height of the second map 340, such as sofa 316b, appear in the first map 326 but not the second map 340. Other objects above the height of the first map 326, such as the wall-mounted television 320b, appear in the second map 340 but not the first map 326. Some tall objects, such as shelving 312b, 312c, may appear in both maps 326, 340. The device 110 and/or system 120 may select a height and corresponding map that best approximates the height of the camera 114 when it is extended on the mast 112. The device 110 and/or system 120 may instead or in addition select a map 326, 340 that has a lowest number of travel points and set the height of the camera 114 as closely as possible to the height of the selected map.

Figure 3D:
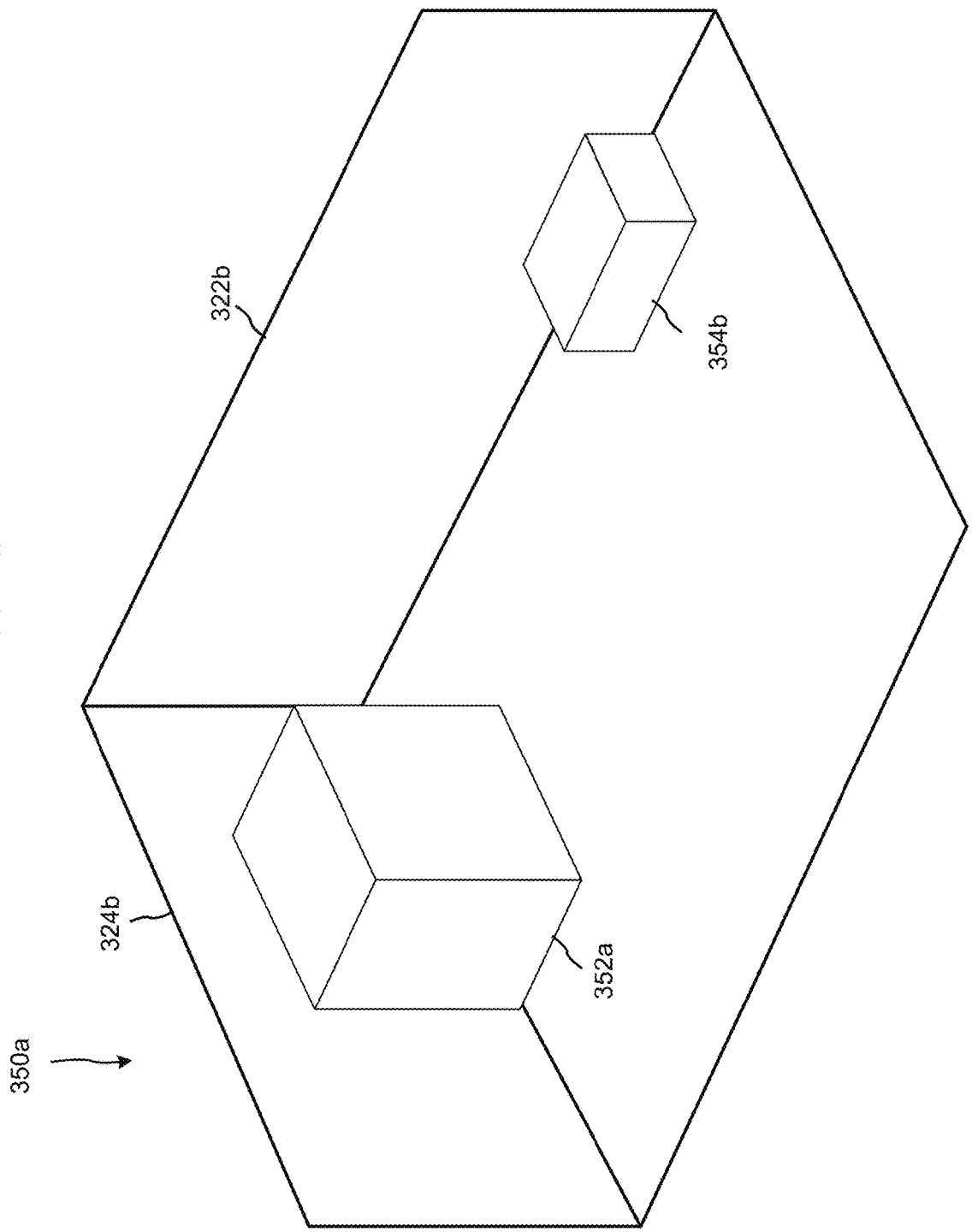
Figure 3E:
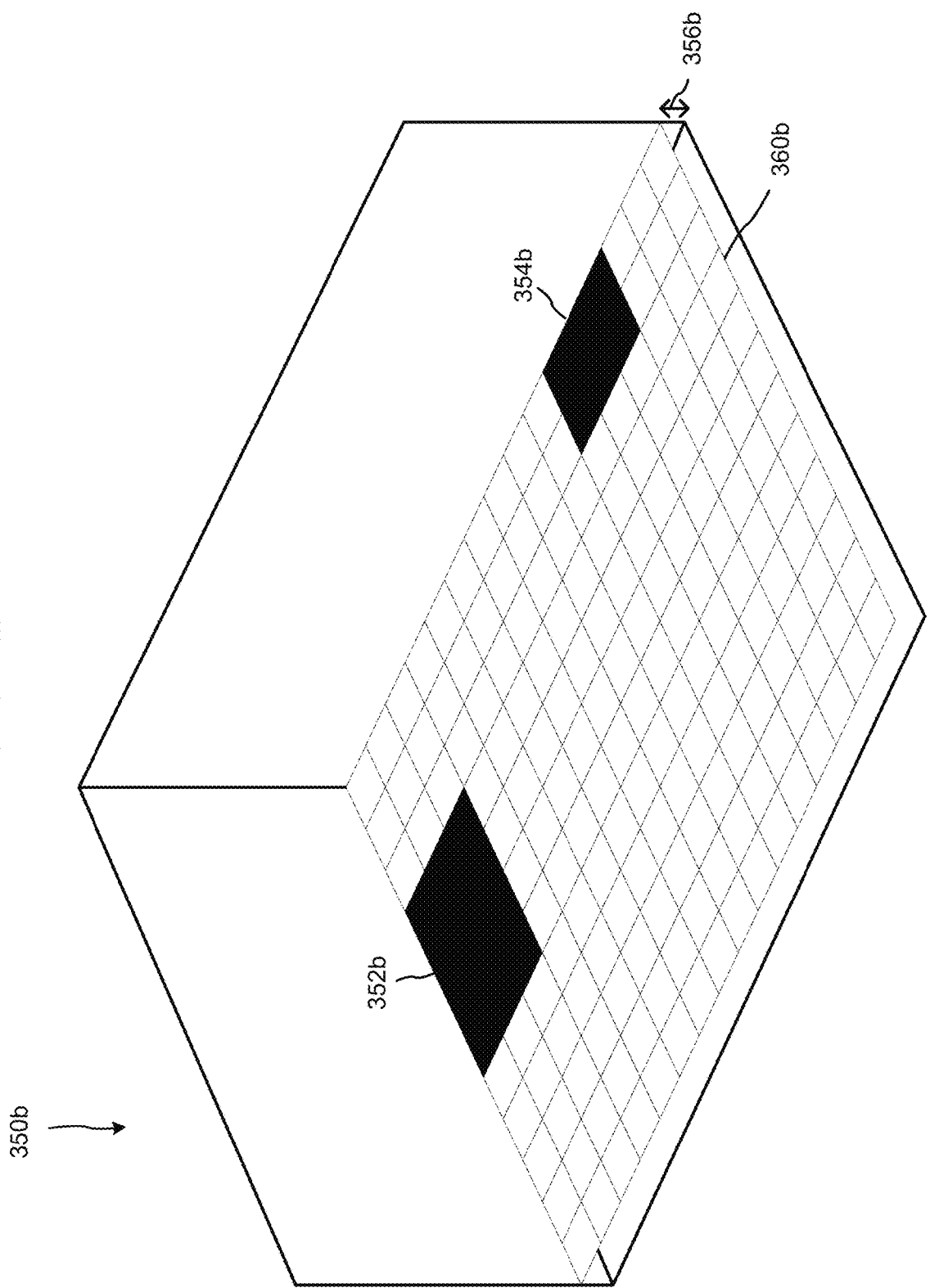
Figure 3G:
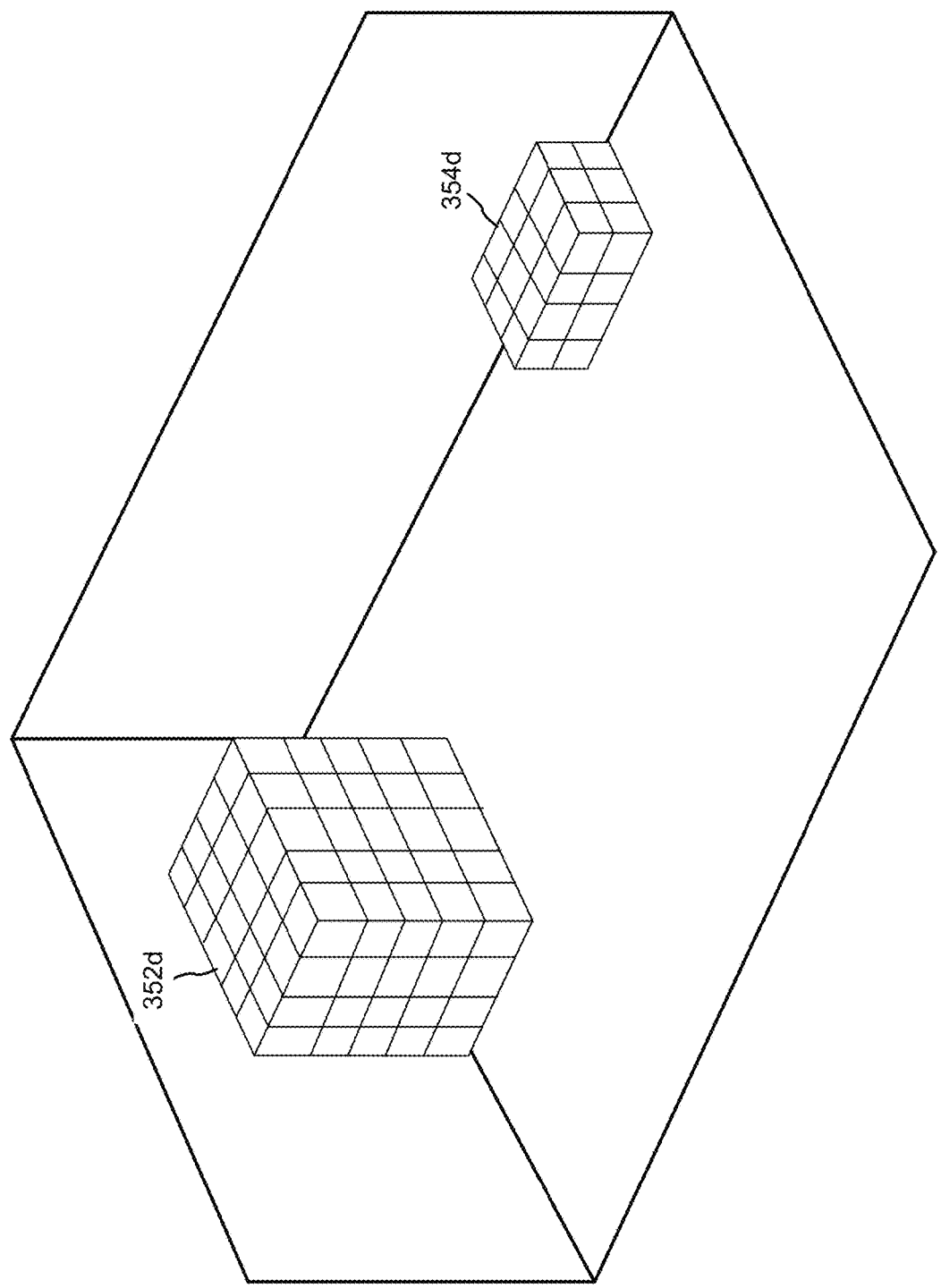

FIG. 3D illustrates a three-dimensional view of another environment 350a that includes a first object 352a and a second object 354b. FIG. 3E illustrates that a first map 360b at a first height 356a includes representations 352b, 354b of both the first object 352a and the second object 354b. FIG. 3F illustrates that a second map 360c at a second height 356b includes representations 352c of just the first object 352a. In some embodiments, with reference to FIG. 3G, the objects 352a, 354a may be modeled using three-dimensional models 352d, 354d, which may be constructed from three-dimensional grid units. The three-dimensional models 352d, 354d may be used to determine a three-dimensional viewable volume for a candidate location; the size of the three-dimensional viewable volume may correspond to degrees of freedom of the camera 114 other than the 360 degree rotation described above, such as panning and tilting. The device 110 and/or system 120 may move the line segment described above across not just the 360 degree horizontal rotation, but up or down in accordance with the panning and tilting. The remainder of the process is similar to the two-dimensional process described above.

Once the travel points are determined, the device 110 may periodically and/or on command travel to each of the travel points, capture image data such as a panoramic image, and transmit the image data to the system 120 and/or user device 122. The device 110 may determine the order in which it travels to the travel points to minimize the total distance travelled using, for example, a brute-force algorithm. The device 110 may travel in a loop when it travels to the travel points and may thus return to its original location (e.g., a docking station). The device 110 may cancel or delay the travel if one or more people are determined to be in the environment 102. The device 110 may determine presence of one or more people by processing input audio (e.g., determine that input audio data represents speech or non-speech utterances), by processing input images (e.g., determine that a captured image includes a shape of a person), or by other means.

If, during or after travel, the device 110 and/or system 120 determines that the captured image data depicts a suspicious event, (e.g., glass breaking, an alarm sounding, or unrecognized people present), the device 110 and/or system 120 may send an indication of the event to the user device 122. The indication may further include a location (e.g., room) of the event.

During travel, the device 110 may determine occurrence of an event but did not or cannot capture image data representing the event. This situation may occur if, for example, the device 110 detects the event via audio but the event is outside a range of the camera 114. The device 110 may determine that one of the travel locations yet to be visited in its route is located such that the device 110 will be able to capture image data representing the event there; if so, the device 110 may not deviate from its planned route. If, however, the device 110 has already visited in its route a travel location that image data captured there would have represented the event, the device 110 may re-visit that location. If no travel location on the route is a location at which the event could be observed, the device 110 may deviate from the route (by, for example, moving in a direction of a sound of the event). Upon detection of certain dangerous events, such as detection of an intruder in the environment 102, the device 110 may return to its default position in the environment 102 (e.g., its docking station) and/or travel away from the location of the event.

In some embodiments, the device 110 and/or system 120 determines that something changed in the environment 102, such as moving of an item of furniture such as the sofa 316b. The device 110 may observe the change using its camera 114 or the device 110 and/or system 120 may receive an updated map 326 reflecting the change. The device 110 and/or system 120 may thereafter repeat the above process of travel location select to reflect the change in the environment. In some embodiments, only those selected travel points proximate the change (e.g., in the same room) are re-selected; the rest remain unchanged.

Instead of or in addition to the method of travel location selection described above, the device 110 and/or system 120 may determine one or more quality metrics for each grid unit 328 and may select the travel locations based on locations having the largest quality metric(s). A first quality metric for a grid unit 328 may represent how far the grid unit 328 is from a nearest obstruction, such as a wall 322, 324 or object, such as the sofa 316. A second quality metric for a grid unit 328 estimates the viewable area from the grid unit 328 by first determining, for at least three line segments extending from the grid unit 328 a point of intersection with a nearest obstruction. These points of intersection may then be used to construct polygon having the points as vertices; the second quality metric is the area of this polygon. Different types of quality metrics may be used together to select the travel locations; they may be first normalized before they are combined.

FIGS. 4A-4D illustrate an autonomously motile device 110 capable of changing a position of a moveable component. In these figures, the moveable component is a mast 112 having a camera 114 disposed thereon. Referring first to FIG. 4A, the mast 112 and camera 114 may be hidden behind a mast housing 406, which may be flush with a top surface of a display support 404. The display support 404 may be in mechanical contact with a display housing 402; this mechanical contact may include a hinging mechanism that allows the display housing to pan, tilt, or rotate with respect to the device 110. The display housing 402 may house the display 214.

FIGS. 4B, 4C, and 4D illustrate that the mast 112 may be disposed in different positions relative to the autonomously motile device 110. The positions may be a set of discrete positions or may be a spectrum of positions between a minimum height and a maximum height. Referring first to FIG. 4B, the autonomously motile device 110 may cause the mast 112 to extend from the mast housing 406 to a first position. In this first position, the camera 114 may be disposed at a first height above the mast housing 406; this first height may be, for example, 20 centimeters above the mast housing 406. The autonomously motile device 110 may cause the mast 112 to move using an electrically controllable motor, such as a stepper motor. The autonomously motile device 110 may determine that the mast 112 is in the first position based on a length of time of operation of the motor (or other such actuator), by receiving feedback from a sensor, or both.

Referring to FIG. 4C, the autonomously motile device 110 may continue to extend the mast 112 until the camera 114 is in a second position relative to the mast housing 406. This second position may be, for example, 100 centimeters above the mast housing 406. The autonomously motile device 110 may similarly cause the mast 112 to move using an electrically controllable motor, and may similarly determine that the camera 114 is in the second position using the timer and/or sensor.

Referring to FIG. 4D, the autonomously motile device 110 may continue to extend the mast 112 until the camera 114 is in a third position relative to the mast housing 406. This third position may be, for example, 200 centimeters above the mast housing 406. The autonomously motile device 110 may similarly cause the mast 112 to move using an electrically controllable motor, and may similarly determine that the camera 114 is in the third position using the timer and/or sensor. In this example, the mast 112 may have two components: a first component mast A 112a having a diameter similar to that of the mast 112 described above with reference to FIGS. 4B and 4C, and a second component mast B 112b having a diameter greater than that of the mast 112 described above with reference to FIGS. 4B and 4C. The mast 112 may include additional components of even greater diameter to permit the mast 112 to extend still further.

FIG. 5A is a block diagram conceptually illustrating an autonomously motile device 110 in accordance with the present disclosure. FIG. 6 is a block diagram conceptually illustrating example components of a system 120, such as remote server, which may assist with creating a map of an environment 102, ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

Each of these devices (110/120) may include one or more controllers/processors (504/604), which may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive memory (MRAM), and/or other types of memory. Each device (110/120) may also include a data storage component (508/608) for storing data and controller/processor-executable instructions. Each data storage component (508/608) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces (502/602), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 5A, the autonomously motile device 110 may include input/output device interfaces 502 that connect to a variety of components such as an audio output component such as a speaker 512, a wired headset or a wireless headset (not illustrated), or other component capable of outputting audio. The autonomously motile device 110 may also include an audio capture component. The audio capture component may be, for example, a microphone 520 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 114/116/212, actuator, and/or sensor 554.

The components of the device(s) 110 and/or the system(s) 120 may include their own dedicated processors, memory, and/or storage. Alternatively, one or more of the components of the device(s) 110 and/or the system(s) 120 may utilize the I/O interfaces (502/602), processor(s) (504/604), memory (506/606), and/or storage (508/608) of the device(s) 110 and/or the system(s) 120, respectively.

FIG. 5B illustrates components that may be stored in a memory of an autonomously motile device according to embodiments of the present disclosure. Although illustrated as included in memory 506, the components (or portions thereof) may also be included in hardware and/or firmware. FIG. 5C illustrates data that may be stored in a storage of an autonomously motile device according to embodiments of the present disclosure. Although illustrated as stored in storage 508, the data may be stored in memory 506 or in another component. FIG. 5D illustrates sensors that may be included as part of an autonomously motile device according to embodiments of the present disclosure.

A position determination component 532 determines position data 544 indicative of a position 284 of the feature 286 in the environment 102. In one implementation the position 284 may be expressed as a set of coordinates with respect to the first camera 114a/116a/212a. The position determination component 532 may use a direct linear transformation triangulation process to determine the position 284 of a feature 286 in the environment 102 based on the difference in apparent location of that feature 286 in two images acquired by two cameras 114/116/212 separated by a known distance.

A movement determination module 533 determines if the feature 286 is stationary or non-stationary. First position data 544a indicative of a first position 284a of a feature 286 depicted in the first pair of images 282a acquired at time $t_1$ is determined by the position determination component 532. Second position data 544b of the same feature 286 indicative of a second position 284b of the same feature 286 as depicted in the second pair of images 282b acquired at time $t_2$ is determined as well. Similar determinations made for data relative to first position 284a and second position 284b may also be made for third position 284c, and so forth.

The movement determination module 533 may use inertial data from the IMU 580 or other sensors that provides information about how the autonomously motile device 110 moved between time $t_1$ and time $t_2$. The inertial data and the first position data 544a is used to provide a predicted position of the feature 286 at the second time. The predicted position is compared to the second position data 544b to determine if the feature is stationary or non-stationary. If the predicted position is less than a threshold value from the second position 284b in the second position data 544b, then the feature 286 is deemed to be stationary.

Features 286 that have been deemed to be stationary may be included in the second feature data. The second feature data may thus exclude non-stationary features 286 and comprise a subset of the first feature data 548 which comprises stationary features 286.

The second feature data may be used by a simultaneous localization and mapping (SLAM) component 534. The SLAM component 534 may use second feature data to determine pose data 545 that is indicative of a location of the autonomously motile device 110 at a given time based on the appearance of features 286 in pairs of images 282. The SLAM component 534 may also provide trajectory data indicative of the trajectory 112 that is based on a time series of pose data 545 from the SLAM component 534.

Other information, such as depth data from a depth sensor, the position data 544 associated with the features 286 in the second feature data, and so forth, may be used to determine the presence of obstacles 283 in the environment 102 as represented by an occupancy map as represented by occupancy map data 549.

The occupancy map data 549 may comprise data that indicates the location of one or more obstacles 283, such as a table, wall, stairwell, and so forth. In some implementations, the occupancy map data 549 may comprise a plurality of cells with each cell of the plurality of cells representing a particular area in the environment 102. Data, such as occupancy values, may be stored that indicates whether an area of the environment 102 associated with the cell is unobserved, occupied by an obstacle 283, or is unoccupied. An obstacle 283 may comprise an object or feature that prevents or impairs traversal by the autonomously motile device 110. For example, an obstacle 283 may comprise a wall, stairwell, and so forth.

The occupancy map data 549 may be manually or automatically determined. For example, during a learning phase the user may take the autonomously motile device 110 on a tour of the environment 102, allowing the mapping component 530 of the autonomously motile device 110 to determine the occupancy map data 549. The user may provide input data such as tags designating a particular obstacle type, such as "furniture" or "fragile". In another example, during subsequent operation, the autonomously motile device 110 may generate the occupancy map data 549 that is indicative of locations and types of obstacles such as chairs, doors, stairwells, and so forth as it moves unattended through the environment 102.

Modules described herein, such as the mapping component 530, may provide various processing functions such as de-noising, filtering, and so forth. Processing of sensor data 547, such as image data from a camera 114/116/212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 547. In still another implementation, functions such as those in the Machine Vision Toolbox (MVTB) available using MAT-LAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 547 or other data. For example, the ANN may be trained using a supervised learning algorithm such that object identifiers are associated with images of particular objects within training images provided to the ANN. Once trained, the ANN may be provided with the sensor data 547 and produce output indicative of the object identifier.

A navigation map component 535 uses the occupancy map data 549 as input to generate a navigation map as represented by navigation map data 550. For example, the navigation map component 535 may produce the navigation map data 550 by inflating or enlarging the apparent size of obstacles 283 as indicated by the occupancy map data 549.

An autonomous navigation component 536 provides the autonomously motile device 110 with the ability to navigate within the environment 102 without real-time human interaction. The autonomous navigation component 536 may implement, or operate in conjunction with, the mapping component 530 to determine one or more of the occupancy map data 549, the navigation map data 550, or other representations of the environment 102.

The autonomously motile device 110 autonomous navigation component 536 may generate path plan data 552 that is indicative of a path through the environment 102 from the current location to a destination location. The autonomously motile device 110 may then begin moving along the path.

While moving along the path, the autonomously motile device 110 may assess the environment 102 and update or change the path as appropriate. For example, if an obstacle 283 appears in the path, the mapping component 530 may determine the presence of the obstacle 283 as represented in the occupancy map data 549 and navigation map data 550. The now updated navigation map data 550 may then be used to plan an alternative path to the destination location.

The autonomously motile device 110 may utilize one or more task components 541. The task component 541 comprises instructions that, when executed, provide one or more functions. The task components 541 may perform functions such as finding a user, following a user, present output on output devices of the autonomously motile device 110, perform sentry tasks by moving the autonomously motile device 110 through the environment 102 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 519 to connect to a network 199. For example, the network 199 may comprise a wireless local area network, that in turn is connected to a wide area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 120 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 120 for further processing. The servers 120 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth. In some implementations the other devices may include other AMDs 110, vehicles, and so forth.

In other implementations, other types of autonomous mobile devices (AMD) may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 504 may use data from the clock to associate a particular time with an action, sensor data 547, and so forth.

The autonomously motile device 110 may include one or more hardware processors 504 (processors) configured to execute one or more stored instructions. The processors 504 may comprise one or more cores. The processors 504 may include microcontrollers, systems on a chip, field programmable gate arrays, digital signal processors, graphic processing units, general processing units, and so forth.

The autonomously motile device 110 may include one or more communication component 540 such as input/output (I/O) interfaces 502, network interfaces 519, and so forth. The communication component 540 enable the autonomously motile device 110, or components thereof, to communicate with other devices or components. The communication component 540 may include one or more I/O interfaces 502. The I/O interfaces 502 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 502 may couple to one or more I/O devices. The I/O devices may include input devices such as one or more of a sensor 554, keyboard, mouse, scanner, and so forth. The I/O devices may also include output devices such as one or more of a motor, light, speaker 512, display 214, projector, printer, and so forth. In some embodiments, the I/O devices may be physically incorporated with the autonomously motile device 110 or may be externally placed.

The I/O interface(s) 502 may be configured to provide communications between the autonomously motile device 110 and other devices such as other AMDs 110, docking stations, routers, access points, and so forth, for example through antenna 510 and/or other component. The I/O interface(s) 502 may include devices configured to couple to personal area networks (PANs), local area networks (LANs), wireless local area networks (WLANS), wide area networks (WANs), and so forth. For example, the network interfaces 519 may include devices compatible with Ethernet, Wi-Fi, Bluetooth, Bluetooth Low Energy, ZigBee, and so forth. The autonomously motile device 110 may also include one or more busses 524 or other internal communications hardware or software that allow for the transfer of data between the various modules and components of the autonomously motile device 110.

As shown in FIG. 5A, the autonomously motile device 110 includes one or more memories 506. The memory 506 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 506 provides storage of computer-readable instructions, data structures, program modules, and other data for the operation of the autonomously motile device 110. A few example functional modules are shown stored in the memory 506, although the same functionality may alternatively be implemented in hardware, firmware, or as a system on a chip (SoC).

The memory 506 may include at least one operating system (OS) component 539. The OS component 539 is configured to manage hardware resource devices such as the I/O interfaces 502, the I/O devices, the communication component 540, and provide various services to applications or modules executing on the processors 504. The OS component 539 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 506, or elsewhere may be a data store 508 and one or more of the following modules. These modules may be executed as foreground applications, background tasks, daemons, and so forth. The data store 508 may use a flat file, database, linked list, tree, executable code, script, or other data structure to store information. In some implementations, the data store 508 or a portion of the data store 508 may be distributed across one or more other devices including other AMDs 110, servers 120, network attached storage devices, and so forth.

A communication component 540 may be configured to establish communication with other devices, such as other AMDs 110, an external server 120, a docking station, and so forth. The communications may be authenticated, encrypted, and so forth.

Other modules within the memory 506 may include a safety component 529, the mapping component 530, the navigation map component 535, the autonomous navigation component 536, the one or more components 541, a speech processing component 537, or other components. The components may access data stored within the data store 508, including safety tolerance data 546, sensor data 547, inflation parameters, other data 234, and so forth.

The safety component 529 may access the safety tolerance data 546 to determine within what tolerances the autonomously motile device 110 may operate safely within the environment 102. For example, the safety component 529 may be configured to stop the autonomously motile device 110 from moving when an extensible mast of the autonomously motile device 110 is extended. In another example, the safety tolerance data 546 may specify a minimum sound threshold which, when exceeded, stops all movement of the autonomously motile device 110. Continuing this example, detection of sound such as a human yell would stop the autonomously motile device 110. In another example, the safety component 529 may access safety tolerance data 546 that specifies a minimum distance from an object that the autonomously motile device 110 is to maintain. Continuing this example, when a sensor 554 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 529 may be implemented as hardware, software, or a combination thereof.

The safety component 529 may control other factors, such as a maximum speed of the autonomously motile device 110 based on information obtained by the sensors 554, precision and accuracy of the sensor data 547, and so forth. For example, detection of an object by an optical sensor may include some error, such as when the distance to an object comprises a weighted average between an object and a background. As a result, the maximum speed permitted by the safety component 529 may be based on one or more factors such as the weight of the autonomously motile device 110, nature of the floor, distance to the object, and so forth. In the event that the maximum permissible speed differs from the maximum speed permitted by the safety component 529, the lesser speed may be utilized.

The navigation map component 535 uses the occupancy map data 549 as input to generate the navigation map data 550. The navigation map component 535 may produce the navigation map data 550 to inflate or enlarge the obstacles 283 indicated by the occupancy map data 549. One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the autonomously motile device 110, and so forth.

The speech processing component 537 may be used to process utterances of the user. Microphones may acquire audio in the presence of the autonomously motile device 110 and may send raw audio data 543 to an acoustic front end (AFE). The AFE may transform the raw audio data 543 (for example, a single-channel, 16-bit audio stream sampled at 16 kHz), captured by the microphone, into audio feature vectors that may ultimately be used for processing by various components, such as a wakeword detection module 538, speech recognition engine, or other components. The AFE may reduce noise in the raw audio data 543. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 543, or other operations.

The AFE may divide the raw audio data 543 into frames representing time intervals for which the AFE determines a number of values (i.e., features) representing qualities of the raw audio data 543, along with a set of those values (i.e., a feature vector or audio feature vector) representing features/qualities of the raw audio data 543 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 543, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 543) may be input into a wakeword detection module 538 that is configured to detect keywords spoken in the audio. The wakeword detection module 538 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 538 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 538 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 543 or the audio feature vectors) to one or more server(s) 120 for speech processing. The audio data corresponding to audio obtained by the microphone may be processed locally on one or more of the processors 504, sent to a server 120 for routing to a recipient device or may be sent to the server 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 535, prior to sending to the server 120, and so forth.

The speech processing component 537 may include or access an automated speech recognition (ASR) module. The ASR module may accept as input raw audio data 543, audio feature vectors, or other sensor data 547 and so forth and may produce as output the input data comprising a text string or other data representation. The input data comprising the text string or other data representation may be processed by the navigation map component 535 to determine the command to be executed. For example, the utterance of the command "robot, come here" may result in input data comprising the text string "come here". The wakeword "robot" may be omitted from the input data.

The autonomous navigation component 536 provides the autonomously motile device 110 with the ability to navigate within the environment 102 without real-time human interaction. The autonomous navigation component 536 may implement, or operate in conjunction with, the mapping component 530 to determine the occupancy map data 549, the navigation map data 550, or other representation of the environment 102. In one implementation, the mapping component 530 may use one or more simultaneous localization and mapping ("SLAM") techniques. The SLAM algorithms may utilize one or more of maps, algorithms, beacons, or other techniques to navigate. The autonomous navigation component 536 may use the navigation map data 550 to determine a set of possible paths along which the autonomously motile device 110 may move. One of these may be selected and used to determine path plan data 552 indicative of a path. For example, a possible path that is the shortest or has the fewest turns may be selected and used to determine the path. The path is then subsequently used to determine a set of commands that drive the motors connected to the wheels. For example, the autonomous navigation component 536 may determine the current location within the environment 102 and determine path plan data 552 that describes the path to a destination location such as the docking station.

The autonomous navigation component 536 may utilize various techniques during processing of sensor data 547. For example, image data 542 obtained from cameras 114/116/212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 504, in response to a command received from one or more communication interfaces 204, as determined from the sensor data 547, and so forth. For example, an external server 120 may send a command that is received using the network interface 519. This command may direct the autonomously motile device 110 to proceed to find a particular user, follow a particular user, and so forth. The autonomously motile device 110 may then process this command and use the autonomous navigation component 536 to determine the directions and distances associated with carrying out the command. For example, the command to "come here" may result in a task component 541 sending a command to the autonomous navigation component 536 to move the autonomously motile device 110 to a particular location near the user and orient the autonomously motile device 110 in a particular direction.

The autonomously motile device 110 may connect to the network 199 using one or more of the network interfaces 519. In some implementations, one or more of the modules or other functions described here may execute on the processors 504 of the autonomously motile device 110, on the server 120, or a combination thereof. For example, one or more servers 120 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 508 may store the other data as well. For example, localization settings may indicate local preferences such as language, user identifier data may be stored that allows for identification of a particular user, and so forth.

Figure 5D:
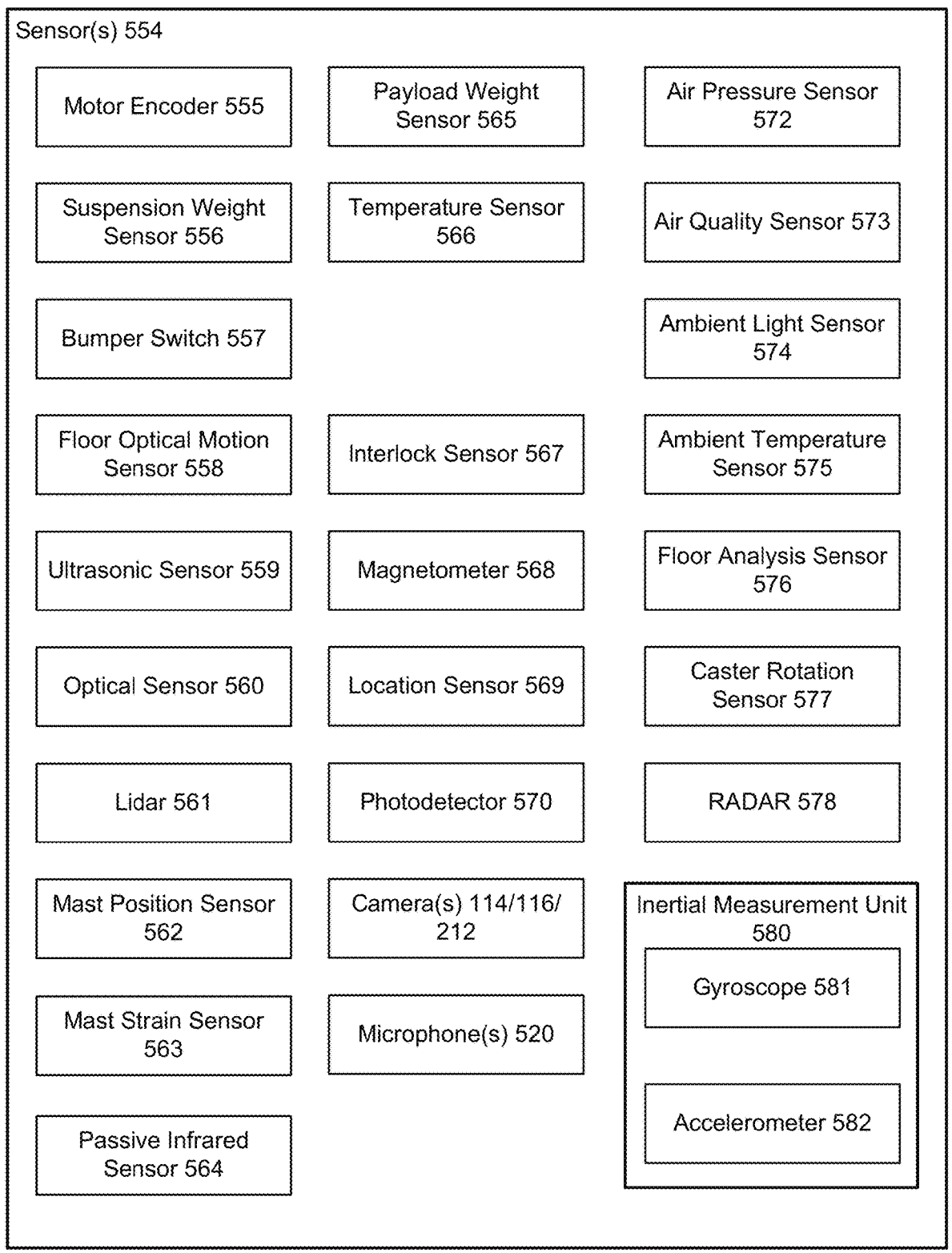
FIG. 5D illustrates sensors that may be included as part of an autonomously motile device according to embodiments of the present disclosure.

As shown in FIG. 5D, the autonomously motile device 110 may include one or more of the following sensors 554. The sensors 554 depicted here are provided by way of illustration and not necessarily as a limitation. It is understood that other sensors 554 may be included or utilized by the autonomously motile device 110, while some sensors 554 may be omitted in some configurations.

A motor encoder 555 provides information indicative of the rotation or linear extension of a motor. The motor may comprise a rotary motor, or a linear actuator. In some implementations, the motor encoder 555 may comprise a separate assembly such as a photodiode and encoder wheel that is affixed to the motor. In other implementations, the motor encoder 555 may comprise circuitry configured to drive the motor. For example, the autonomous navigation component 536 may utilize the data from the motor encoder 555 to estimate a distance traveled.

A suspension weight sensor 556 provides information indicative of the weight of the autonomously motile device 110 on the suspension system for one or more of the wheels or the caster. For example, the suspension weight sensor 556 may comprise a switch, strain gauge, load cell, photodetector, or other sensing element that is used to determine whether weight is applied to a particular wheel, or whether weight has been removed from the wheel. In some implementations, the suspension weight sensor 556 may provide binary data such as a "1" value indicating that there is a weight applied to the wheel, while a "0" value indicates that there is no weight applied to the wheel. In other implementations, the suspension weight sensor 556 may provide an indication such as so many kilograms of force or newtons of force. The suspension weight sensor 556 may be affixed to one or more of the wheels or the caster. In some situations, the safety component 529 may use data from the suspension weight sensor 556 to determine whether or not to inhibit operation of one or more of the motors. For example, if the suspension weight sensor 556 indicates no weight on the suspension, the implication is that the autonomously motile device 110 is no longer resting on its wheels, and thus operation of the motors may be inhibited. In another example, if the suspension weight sensor 556 indicates weight that exceeds a threshold value, the implication is that something heavy is resting on the autonomously motile device 110 and thus operation of the motors may be inhibited.

One or more bumper switches 557 provide an indication of physical contact between a bumper or other member that is in mechanical contact with the bumper switch 557. The safety component 529 utilizes sensor data 547 obtained by the bumper switches 557 to modify the operation of the autonomously motile device 110. For example, if the bumper switch 557 associated with a front of the autonomously motile device 110 is triggered, the safety component 529 may drive the autonomously motile device 110 backwards.

A floor optical motion sensor (FOMS) 558 provides information indicative of motion of the autonomously motile device 110 relative to the floor or other surface underneath the autonomously motile device 110. In one implementation, the FOMS 558 may comprise a light source such as light-emitting diode (LED), an array of photodiodes, and so forth. In some implementations, the FOMS 558 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 558 may provide other information, such as data indicative of a pattern present on the floor, composition of the floor, color of the floor, and so forth. For example, the FOMS 558 may utilize an optoelectronic sensor that may detect different colors or shades of gray, and this data may be used to generate floor characterization data. The floor characterization data may be used for navigation.

An ultrasonic sensor 559 utilizes sounds in excess of 20 kHz to determine a distance from the sensor 554 to an object. The ultrasonic sensor 559 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 559 may provide information indicative of a presence of an object, distance to the object, and so forth. Two or more ultrasonic sensors 559 may be utilized in conjunction with one another to determine a location within a two-dimensional plane of the object.

In some implementations, the ultrasonic sensor 559 or a portion thereof may be used to provide other functionality. For example, the emitter of the ultrasonic sensor 559 may be used to transmit data and the detector may be used to receive data transmitted that is ultrasonic sound. In another example, the emitter of an ultrasonic sensor 559 may be set to a particular frequency and used to generate a particular waveform such as a sawtooth pattern to provide a signal that is audible to an animal, such as a dog or a cat.

An optical sensor 560 may provide sensor data 547 indicative of one or more of a presence or absence of an object, a distance to the object, or characteristics of the object. The optical sensor 560 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 560 may utilize one or more sensing elements. For example, the optical sensor 560 may comprise a 4×4 array of light sensing elements. Each individual sensing element may be associated with a field of view (FOV) that is directed in a different way. For example, the optical sensor 560 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 554 such as an image sensor or camera 114/116/212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 560 may operate as a depth camera, providing a two-dimensional image of a scene, as well as data that indicates a distance to each pixel.

Data from the optical sensors 560 may be utilized for collision avoidance. For example, the safety component 529 and the autonomous navigation component 536 may utilize the sensor data 547 indicative of the distance to an object in order to prevent a collision with that object.

Multiple optical sensors 560 may be operated such that their FOV overlap at least partially. To minimize or eliminate interference, the optical sensors 560 may selectively control one or more of the timing, modulation, or frequency of the light emitted. For example, a first optical sensor 560 may emit light modulated at 30 kHz while a second optical sensor 560 emits light modulated at 33 kHz.

A lidar 561 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 547 may be generated that is indicative of the presence of objects and the relative positions, shapes, and so forth that are visible to the lidar 561. Data from the lidar 561 may be used by various modules. For example, the autonomous navigation component 536 may utilize point cloud data generated by the lidar 561 for localization of the autonomously motile device 110 within the environment 102.

The autonomously motile device 110 may include a mast. A mast position sensor 562 provides information indicative of a position of the mast of the autonomously motile device 110. For example, the mast position sensor 562 may comprise limit switches associated with the mast extension mechanism that indicate whether the mast is at an extended or retracted position. In other implementations, the mast position sensor 562 may comprise an optical code on at least a portion of the mast that is then interrogated by an optical emitter and a photodetector to determine the distance to which the mast is extended. In another implementation, the mast position sensor 562 may comprise an encoder wheel that is attached to a mast motor that is used to raise or lower the mast. The mast position sensor 562 may provide data to the safety component 529. For example, if the autonomously motile device 110 is preparing to move, data from the mast position sensor 562 may be checked to determine if the mast is retracted, and if not, the mast may be retracted prior to beginning movement.

A mast strain sensor 563 provides information indicative of a strain on the mast with respect to the remainder of the autonomously motile device 110. For example, the mast strain sensor 563 may comprise a strain gauge or load cell that measures a side-load applied to the mast or a weight on the mast or downward pressure on the mast. The safety component 529 may utilize sensor data 547 obtained by the mast strain sensor 563. For example, if the strain applied to the mast exceeds a threshold amount, the safety component

529 may direct an audible and visible alarm to be presented by the autonomously motile device 110.

The autonomously motile device 110 may include a modular payload bay. A payload weight sensor 565 provides information indicative of the weight associated with the modular payload bay. The payload weight sensor 565 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 565 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 565 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 529 may utilize the payload weight sensor 565 to determine if the modular payload bay has been overloaded. If so, an alert or notification may be issued.

One or more device temperature sensors 566 may be utilized by the autonomously motile device 110. The device temperature sensors 566 provide temperature data of one or more components within the autonomously motile device 110. For example, a device temperature sensor 566 may indicate a temperature of one or more the batteries, one or more motors, and so forth. In the event the temperature exceeds a threshold value, the component associated with that device temperature sensor 566 may be shut down.

One or more interlock sensors 567 may provide data to the safety component 529 or other circuitry that prevents the autonomously motile device 110 from operating in an unsafe condition. For example, the interlock sensors 567 may comprise switches that indicate whether an access panel is open. The interlock sensors 567 may be configured to inhibit operation of the autonomously motile device 110 until the interlock switch indicates a safe condition is present.

An inertial measurement unit (IMU) 580 may include a plurality of gyroscopes 581 and accelerometers 582 arranged along different axes. The gyroscope 581 may provide information indicative of rotation of an object affixed thereto. For example, a gyroscope 581 may generate sensor data 547 that is indicative of a change in orientation of the autonomously motile device 110 or a portion thereof.

The accelerometer 582 provides information indicative of a direction and magnitude of an imposed acceleration. Data such as rate of change, determination of changes in direction, speed, and so forth may be determined using the accelerometer 582. The accelerometer 582 may comprise mechanical, optical, micro-electromechanical, or other devices. For example, the gyroscope 581 in the accelerometer 582 may comprise a prepackaged solid-state unit.

A magnetometer 568 may be used to determine an orientation by measuring ambient magnetic fields, such as the terrestrial magnetic field. For example, the magnetometer 568 may comprise a Hall effect transistor that provides output compass data indicative of a magnetic heading.

The autonomously motile device 110 may include one or more location sensors 569. The location sensors 569 may comprise an optical, radio, or other navigational system such as a global positioning system (GPS) receiver. For indoor operation, the location sensors 569 may comprise indoor position systems, such as using Wi-Fi Positioning Systems (WPS). The location sensors 569 may provide information indicative of a relative location, such as "living room" or an absolute location such as particular coordinates indicative of latitude and longitude, or displacement with respect to a predefined origin.

A photodetector 570 provides sensor data 547 indicative of impinging light. For example, the photodetector 570 may provide data indicative of a color, intensity, duration, and so forth.

A camera 114/116/212 generates sensor data 547 indicative of one or more images. The camera 114/116/212 may be configured to detect light in one or more wavelengths including, but not limited to, terahertz, infrared, visible, ultraviolet, and so forth. For example, an infrared camera 114/116/212 may be sensitive to wavelengths between approximately 700 nanometers and 1 millimeter. The camera 114/116/212 may comprise charge coupled devices (CCD), complementary metal oxide semiconductor (CMOS) devices, microbolometers, and so forth. The autonomously motile device 110 may use image data acquired by the camera 114/116/212 for object recognition, navigation, collision avoidance, user communication, and so forth. For example, a pair of cameras 114/116/212 sensitive to infrared light may be mounted on the front of the autonomously motile device 110 to provide binocular stereo vision, with the sensor data 547 comprising images being sent to the autonomous navigation component 536. In another example, the camera 114/116/212 may comprise a 10 megapixel or greater camera that is used for videoconferencing or for acquiring pictures for the user.

The camera 114/116/212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 114/116/212, particularly those associated with navigation or autonomous operation, may utilize a global shutter. In other implementations, the camera(s) 114/116/212 providing images for use by the autonomous navigation component 536 may be acquired using a rolling shutter and subsequently may be processed to mitigate image artifacts.

One or more microphones 520 may be configured to acquire information indicative of sound present in the environment 102. In some implementations, arrays of microphones 520 may be used. These arrays may implement beamforming techniques to provide for directionality of gain. The autonomously motile device 110 may use the one or more microphones 520 to acquire information from acoustic tags, accept voice input from users, determine a direction of an utterance, determine ambient noise levels, for voice communication with another user or system, and so forth.

An air pressure sensor 572 may provide information indicative of an ambient atmospheric pressure or changes in ambient atmospheric pressure. For example, the air pressure sensor 572 may provide information indicative of changes in air pressure due to opening and closing of doors, weather events, and so forth.

An air quality sensor 573 may provide information indicative of one or more attributes of the ambient atmosphere. For example, the air quality sensor 573 may include one or more chemical sensing elements to detect the presence of carbon monoxide, carbon dioxide, ozone, and so forth. In another example, the air quality sensor 573 may comprise one or more elements to detect particulate matter in the air, such as the photoelectric detector, ionization chamber, and so forth. In another example, the air quality sensor 573 may include a hygrometer that provides information indicative of relative humidity.

An ambient light sensor 574 may comprise one or more photodetectors or other light-sensitive elements that are used to determine one or more of the color, intensity, or duration of ambient lighting around the autonomously motile device 110.

An ambient temperature sensor 575 provides information indicative of the temperature of the ambient environment 102 proximate to the autonomously motile device 110. In some implementations, an infrared temperature sensor may be utilized to determine the temperature of another object at a distance.

A floor analysis sensor 576 may include one or more components that are used to generate at least a portion of floor characterization data. In one implementation, the floor analysis sensor 576 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 576 may be used by one or more of the safety component 529, the autonomous navigation component 536, the task component 541, and so forth. For example, if the floor analysis sensor 576 determines that the floor is wet, the safety component 529 may decrease the speed of the autonomously motile device 110 and generate a notification alerting the user.

The floor analysis sensor 576 may include other components as well. For example, a coefficient of friction sensor may comprise a probe that comes into contact with the surface and determines the coefficient of friction between the probe and the floor.

A caster rotation sensor 577 provides data indicative of one or more of a direction of orientation, angular velocity, linear speed of the caster, and so forth. For example, the caster rotation sensor 577 may comprise an optical encoder and corresponding target that is able to determine that the caster transitioned from an angle of 0° at a first time to 49° at a second time.

The sensors 554 may include a radar 578. The radar 578 may be used to provide information as to a distance, lateral position, and so forth, to an object.

The sensors 554 may include a passive infrared (PIR) sensor 564. The PIR 564 sensor may be used to detect the presence of users, pets, hotspots, and so forth. For example, the PIR sensor 564 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 102 to provide landmarks for the autonomous navigation component 536. One or more touch sensors may be utilized to determine contact with a user or other objects.

The autonomously motile device 110 may include one or more output devices. A motor (not shown) may be used to provide linear or rotary motion. A light 522 may be used to emit photons. A speaker 512 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 120 as described herein, are illustrative, and may be located as a stand-alone device or may be included, in whole or in part, as a component of a larger device or system.

As illustrated in FIG. 7 and as discussed herein, the autonomously motile device 110 may communicate, using the network 199, with the system 120 and/or a user device 122. The network(s) 199 may include a local or private network or may include a wide network such as the Internet. The devices may be connected to the network(s) 199 through either wired or wireless connections. Example user devices 122 include a cellular phone 122a, a refrigerator 122b, a microphone 122c, a loudspeaker 122d, a tablet computer 122e, a desktop computer 122f, and a laptop computer 122g, which may be connected to the network(s)

199 through a wireless service provider, over a Wi-Fi or cellular network connection, or the like. Other devices are included as network-connected support devices, such as the system(s) 120, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving data representing an occupancy map of an environment;
   determining a set of candidate locations in the occupancy map;
   determining, using an autonomously motile device, a first candidate location in the set of candidate locations and a second candidate location in the set of candidate locations;
   determining, using the autonomously motile device, that the first candidate location corresponds to a larger view of the environment than does the second candidate location;
   traveling to a location in the environment corresponding to the first candidate location; and
   capturing, using the autonomously motile device, image data representing a portion of the environment.

2. The computer-implemented method of claim 1, wherein determining that the first candidate location corresponds to the larger view comprises:
   determining a first size of a first area surrounding the first candidate location, the first area corresponding to a first set of cells, wherein each cell in the first set has an obstacle value indicating that the cell is navigable;
   determining a second size of a second area surrounding the second candidate location, the second area corresponding to a second set of cells, wherein each cell in the second set has the obstacle value; and
   determining that the first size is greater than the second size.

3. The computer-implemented method of claim 2, further comprising:
   determining a third size of a third area surrounding a third candidate location, the third area corresponding to a third set of cells, wherein each cell in the third set has the obstacle value;
   determining that the second size is greater than the third size;
   determining that a first amount of overlap between the first area and the second area is greater than a second amount of overlap between the first area and the third area; and
   traveling to a second location in the environment corresponding to the third candidate location.

4. The computer-implemented method of claim 2, further comprising:
   prior to traveling to the location, determining that the first area and the second area include an overlapping area;
   determining a modified second area by removing the overlapping area from the second area;
   determining a third size of the modified second area;
   determining that the third size is greater than a fourth size of a fourth area surrounding a third second candidate location; and
   traveling to a second location in the environment corresponding to the second candidate location.

5. The computer-implemented method of claim 2, wherein the occupancy map comprises a plurality of grid tiles, wherein:
   determining the first size of the first area comprises determining a first number of grid tiles that are disposed between the first candidate location and any obstruction; and determining the second size of the second area comprises determining a second number of grid tiles that are disposed between the second candidate location and any obstruction.

6. The computer-implemented method of claim 1, further comprising:
determining a distance between the first candidate location and an object;
determining a weight corresponding to the distance; and
determining a weighted size by applying the weight to a size of an area surrounding the first candidate location,
wherein determining that the first candidate location corresponds to the larger view is based at least in part on the weighted size.

7. The computer-implemented method of claim 1, further comprising:
processing the image data to determine that it represents a depiction of an event;
determining a location of the event; and
sending, to a user device, an indication of the event and the location.

8. The computer-implemented method of claim 1, further comprising:
receiving audio data;
determining that the audio data represents an event;
determining a location of the event;
traveling to the location; and
capturing second image data representing the event.

9. The computer-implemented method of claim 1, further comprising:
receiving second data representing a second map of the environment;
determining the data representing the occupancy map corresponds to a first height;
determining that the second data representing the second map corresponds to a second height; and
determining that the first height more closely corresponds to a height of a camera of an autonomously motile device than does the second height.

10. A system comprising:
at least one processor; and
at least one memory including instructions that, when executed by the at least one processor, cause the system to:
receive data representing an occupancy map of an environment;
determine a set of candidate locations in the occupancy map;
determine, using an autonomously motile device, a first candidate location in the set of candidate locations and a second candidate location in the set of candidate locations;
determine, using an autonomously motile device, that the first candidate location corresponds to a larger view of the environment than does the second candidate location;
travel a location in the environment corresponding to the first candidate location; and
capture, using the autonomously motile device, image data representing a portion of the environment.

11. The system of claim 10, wherein the at least one memory further comprises instructions that, when executed by the at least one processor, further cause the system to:
determine a first size of a first area surrounding the first candidate location, the first area corresponding to a first set of cells, wherein each cell in the first set has an obstacle value indicating that the cell is navigable;
determine a second size of a second area surrounding the second candidate location, the second area corresponding to a second set of cells, wherein each cell in the second set has the obstacle value; and
determine that the first size is greater than the second size.

12. The system of claim 11, wherein the at least one memory further comprises instructions that, when executed by the at least one processor, further cause the system to:
determine a third size of a third area surrounding a third candidate location, the third area corresponding to a third set of cells, wherein each cell in the third set has the obstacle value;
determine that the second size is greater than the third size;
determine that a first amount of overlap between the first area and the second area is greater than a second amount of overlap between the first area and the third area; and
travel to a second location in the environment corresponding to the third candidate location.

13. The system of claim 11, wherein the at least one memory further comprises instructions that, when executed by the at least one processor, further cause the system to:
prior to traveling to the location, determine that the first area and the second area include an overlapping area;
determine a modified second area by removing the overlapping area from the second area;
determine a third size of the modified second area;
determine that the third size is greater than a fourth size of a fourth area surrounding a third second candidate location; and
travel to a second location in the environment corresponding to the second candidate location.

14. The system of claim 11, wherein the occupancy map comprises a plurality of grid tiles, and wherein:
the instructions that cause the system to determine the first size of the first area comprise instructions that, when executed by the at least one processor, cause the system to determine a first number of grid tiles that are disposed between the first candidate location and any obstruction, and
the instructions that cause the system to determine the second size of the second area comprise instructions that, when executed by the at least one processor, cause the system to determine a second number of grid tiles that are disposed between the second candidate location and any obstruction.

15. The system of claim 10, wherein the at least one memory further comprises instructions that, when executed by the at least one processor, further cause the system to:
determine a distance between the first candidate location and an object;
determine a weight corresponding to the distance; and
determine a weighted size by applying the weight to a size of an area surrounding the first candidate location,
wherein determination that the first candidate location corresponds to the larger view is based at least in part on the weighted size.

16. The system of claim 10, wherein the at least one memory further comprises instructions that, when executed by the at least one processor, further cause the system to:
process the image data to determine that it represents a depiction of an event;
determine a location of the event; and
send, to a user device, an indication of the event and the location.

17. The system of claim 10, wherein the at least one memory further comprises instructions that, when executed by the at least one processor, further cause the system to:
- receive audio data;
- determine that the audio data represents an event;
- determine a location of the event;
- travel to the location; and
- capture second image data representing the event.

18. The system of claim 10, wherein the at least one memory further comprises instructions that, when executed by the at least one processor, further cause the system to:
- receive second data representing a second map of the environment;
- determine the data representing the occupancy map corresponds to a first height;
- determine that the second data representing the second map corresponds to a second height; and
- determine that the first height more closely corresponds to a height of a camera of an autonomously motile device than does the second height.

19. The computer-implemented method of claim 1, further comprising, prior to traveling to the location:
- receiving input data; and
- determining that a response to the input data involves an image of the environment.

20. The system of claim 10, wherein the at least one memory further comprises instructions that, when executed by the at least one processor, further cause the system to, prior to traveling to the location:
- receive input data; and
determine that a response to the input data involves an image of the environment.

21. A computer-implemented method comprising:
- receiving data representing an environment;
- determining a first candidate location and a second candidate location;
- determining that an autonomously motile device can capture an image representing a larger portion of the environment from the first candidate location than from the second candidate location;
- causing the autonomously motile device to travel to a location corresponding to the first candidate location; and
- capturing, using the autonomously motile device, image data representing a portion of the environment.

* * * * *